United States Patent
Kozlowski, III

(10) Patent No.: US 11,966,894 B2
(45) Date of Patent: Apr. 23, 2024

(54) APPARATUS FOR CRYPTOGRAPHIC RESOURCE TRANSFER BASED ON QUANTITATIVE ASSESSMENT REGARDING NON-FUNGIBLE TOKENS

(71) Applicant: Glimpse Enterprises Incorporated, New York, NY (US)

(72) Inventor: Theodore Kozlowski, III, Greenville, SC (US)

( * ) Notice: Subject to any disclaimer, the term of this patent is extended or adjusted under 35 U.S.C. 154(b) by 0 days.

(21) Appl. No.: 17/729,071

(22) Filed: Apr. 26, 2022

(65) Prior Publication Data
US 2023/0120897 A1    Apr. 20, 2023

Related U.S. Application Data

(60) Provisional application No. 63/296,933, filed on Jan. 6, 2022, provisional application No. 63/257,110, filed on Oct. 18, 2021.

(51) Int. Cl.
*G06Q 20/12* (2012.01)
*G06F 16/27* (2019.01)
(Continued)

(52) U.S. Cl.
CPC ......... *G06Q 20/1235* (2013.01); *G06F 16/27* (2019.01); *G06Q 20/4014* (2013.01);
(Continued)

(58) Field of Classification Search
None
See application file for complete search history.

(56) References Cited

U.S. PATENT DOCUMENTS 9,189,789 B1 * 11/2015 Hastings ................ G06Q 40/02
10,127,591 B1 * 11/2018 Wollmer ............ G06Q 30/0603
(Continued)

FOREIGN PATENT DOCUMENTS

| CA | 3094666 A1 * | 9/2019 | ........... A63B 21/015 |
| WO | WO-2019144234 A1 * | 8/2019 | |
| WO | WO2021034852 | 2/2021 | |

OTHER PUBLICATIONS

Pierro, Antonio G., Moaaz Sawaf, Roberto Tonelli "Original or Fake? How to Understand the Digital Artworks' Value in the Blockchain" 2021.
(Continued)

*Primary Examiner* — Neha Patel
*Assistant Examiner* — Jahed Ali
(74) *Attorney, Agent, or Firm* — Caldwell Intellectual Property Law

(57) ABSTRACT

An apparatus for cryptographic resource transfer based on quantitative assessment regarding non-fungible tokens is presented. The apparatus includes at least a processor and a memory communicatively connected to the at least a processor containing instructions configuring the at least a processor to receive a user profile representing a user and an associated cryptographic security, a user digest, and a temporal resource request. The at least a processor is configured to determine a predictive quantifier of the user profile, identify a resource-backed entity to the user as a function of the predictive quantifier, wherein the resource-backed entity includes a cryptographic resource, and generate a token entry. The token entry includes a conditional trigger configured to enable a cryptographic transfer of the cryptographic security and the cryptographic resource, wherein the token entry is configured to be deployed on an immutable sequential listing.

18 Claims, 11 Drawing Sheets

(51) Int. Cl.
 *G06Q 20/40* (2012.01)
 *G06Q 50/18* (2012.01)
 *H04L 9/32* (2006.01)

(52) U.S. Cl.
 CPC ............ *G06Q 50/184* (2013.01); *H04L 9/32* (2013.01); *G06Q 2220/00* (2013.01)

(56) References Cited

U.S. PATENT DOCUMENTS

| | | | |
|---|---|---|---|
| 10,706,472 | B1 | 7/2020 | Myers et al. |
| 11,244,308 | B1* | 2/2022 | Stankiewicz .... G06K 19/06159 |
| 11,315,178 | B1* | 4/2022 | Ridenour ............. G06Q 40/025 |
| 11,334,883 | B1* | 5/2022 | Auerbach ............. G06Q 20/223 |
| 2012/0296702 | A1* | 11/2012 | Fontana ................. G06Q 30/06 705/7.35 |
| 2019/0215149 | A1* | 7/2019 | Ramasamy ............... G06N 3/02 |
| 2019/0258807 | A1* | 8/2019 | DiMaggio ............. G06F 21/577 |
| 2019/0333030 | A1* | 10/2019 | Ramasamy ...... G06Q 20/38215 |
| 2019/0333142 | A1* | 10/2019 | Thomas .................. G06F 16/27 |
| 2020/0027066 | A1* | 1/2020 | Ramasamy ............. G06Q 20/06 |
| 2020/0098040 | A1* | 3/2020 | Ben-Natan ........... G06Q 40/025 |
| 2020/0250571 | A1* | 8/2020 | Almasan ............. G06Q 30/018 |
| 2020/0250623 | A1* | 8/2020 | Duan ................... G06Q 10/063 |
| 2020/0410585 | A1* | 12/2020 | Austin .................. H04L 9/3213 |
| 2021/0082044 | A1* | 3/2021 | Sliwka .................. H04L 9/3255 |
| 2021/0097543 | A1* | 4/2021 | Jia .......................... G06N 20/00 |
| 2021/0241243 | A1* | 8/2021 | Wiklof ............. G06Q 20/38215 |
| 2021/0295324 | A1 | 9/2021 | Kerseboom |
| 2021/0407002 | A1* | 12/2021 | Moy .................... G06Q 40/025 |
| 2022/0414087 | A1* | 12/2022 | McGregor .......... G06F 16/2379 |

OTHER PUBLICATIONS deepnftvalue.com, Nikolai Yakovenko, Zach Nussbaum, 2021.
Fazli, MohammadAmin et. al., "Under the Skin of Foundation NFT Auctions" Mohammad Amin Fazli, Ali Owfi, Mohammad Reza Taesiri. Sep. 25, 2021.
nftvaluations.com, "About NFT Valuations", https://nftvaluations.com/about, 2021.
Wayne, Derek, "Using Machine Learning to Valuate the Bored Ape NFTs" Dec. 6, 2021.
Kireyev, Pavel "Infinite but Rare: Valuation and Pricing in Marketplaces for Blockchain-Based Nonfungible Tokens" Pavel Kireyev, Ruiqi Lin Oct. 2021.
Anyfty, "Anyfty's first results in NFT pricing prediction." Aug. 2021.
Nadini, Matthieu et. al., "Mapping the NFT revolution: market trends, trade networks, and visual features" Sep. 20, 2021.
PR Newswire, "Wave Financial Expands Investment Offerings with World's First Traditional NFT Fund: New NFT fund offers investors exposure to digital art, collectibles market, and the metaverse" Aug. 18, 2021.

* cited by examiner

APPARATUS FOR CRYPTOGRAPHIC RESOURCE TRANSFER BASED ON QUANTITATIVE ASSESSMENT REGARDING NON-FUNGIBLE TOKENS

CROSS-REFERENCE TO RELATED APPLICATIONS

This application claims the benefit of Provisional Application No. 63/296,933, filed on Jan. 6, 2022, and entitled "SYSTEMS AND METHODS OF GENERATING REVENUE BACKED NON-FUNGIBLE TOKENS AND OTHER INVESTMENT VEHICLES," the entirety of which is incorporated herein by reference. This application claims the benefit of Provisional Application No. 63/257,110, filed on Oct. 18, 2021, and entitled "SYSTEMS AND METHODS OF GENERATING REVENUE BACKED NON-FUNGIBLE TOKENS AND OTHER INVESTMENT METHODS," the entirety of which is incorporated herein by reference.

FIELD OF THE INVENTION

The present invention generally relates to the field of non-fungible tokens. In particular, the present invention is directed to an apparatus for cryptographic resource transfer based on quantitative assessment regarding non-fungible tokens.

BACKGROUND

Non-fungible tokens (NFTs) are currently taking the digital art and collectibles world by storm. However, NFTs pose challenges for determining and managing the transfer of cryptographic assets. As cryptographic assets can be used as a vehicle for various methods of generating capital, they can be difficult when used for complex transactions.

SUMMARY OF THE DISCLOSURE

In an aspect, an apparatus for cryptographic resource transfer based on quantitative assessment regarding non-fungible tokens is presented. The apparatus includes at least a processor and a memory communicatively connected to the at least a processor. The memory contains instructions configuring the at least a processor to receive a user profile representing a user, wherein the user profile includes a cryptographic security, a user digest, and a temporal resource request. The at least a processor is configured to determine a predictive quantifier of the user profile, identify a resource-backed entity to the user as a function of the predictive quantifier, wherein the resource-backed entity includes a cryptographic resource, and generate a token entry, wherein the token entry includes a conditional trigger configured to enable a cryptographic transfer of the cryptographic security and the cryptographic resource, wherein the token entry is configured to be deployed on an immutable sequential listing.

In another aspect, a method for cryptographic resource transfer based on quantitative assessment regarding non-fungible tokens. The method includes receiving, by at least a processor communicatively connected to a memory containing instructions for the at least a processor, a user profile representing a user, wherein the user profile includes a cryptographic security, a user digest, and a temporal resource request. The method further includes determining a predictive quantifier of the user profile, identifying a resource-backed entity to the user as a function of the predictive quantifier, wherein the resource-backed entity includes a cryptographic resource, generating a token entry, wherein the token entry includes a conditional trigger configured to enable a cryptographic transfer of the cryptographic security and the cryptographic resource, wherein the token entry is configured to be deployed on an immutable sequential listing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
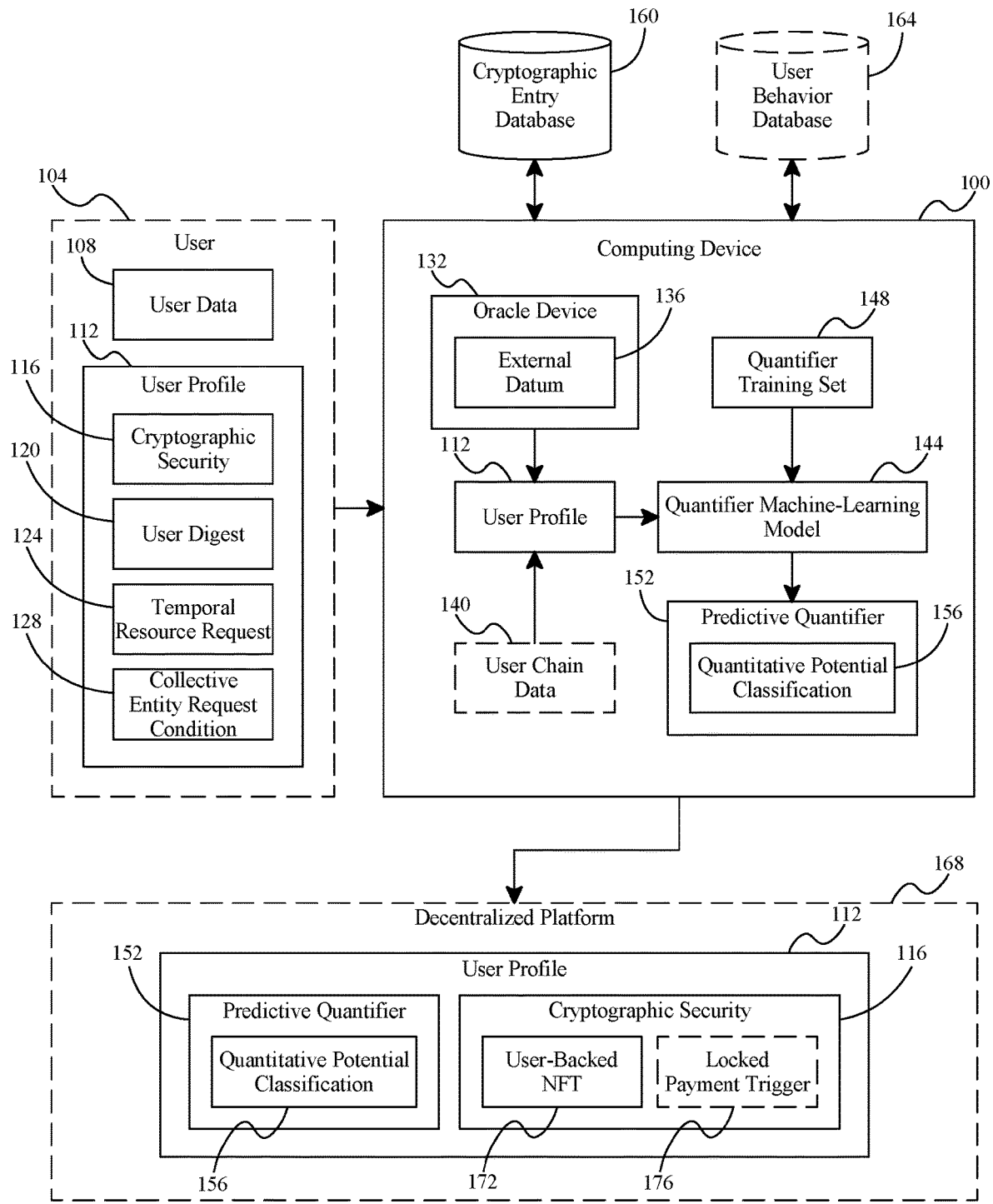
FIG. 1 is a block diagram of an exemplary embodiment of an apparatus for cryptographic resource transfer based on quantitative assessment regarding non-fungible tokens.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. Hence, specific dimensions and other physical characteristics relating to the embodiments disclosed herein are not to be considered as limiting, unless the claims expressly state otherwise.

At a high level, aspects of the present disclosure are directed to an apparatus for cryptographic resource transaction based on quantitative assessment regarding non-fungible tokens. A "non-fungible token" (NFT), as defined, is a cryptographic asset and/or record link to the asset. NFTs include properties that allow them to be exchangeable in a peer-to-peer (P2P) network. NFTs can be exchanged using blockchain technology wherein each NFT contains a unique identification code and metadata that distinguishes it from other NFTs. NFTs may include tokens may be used to represent ownership of unique items such as art, collectibles, even real estate. NFTs give the ability to assign or claim ownership of any unique piece of digital data, trackable by using a decentralized platform as a ledger. Ownership of an NFT is managed through unique metadata and identification that prevents no other token from replicating it; NFT may have a single owner at a time and/or multiple owners of fractional or partial interests in the NFT, which may be conveyed and/or transferred to new owners in bundled or independent transactions. NFTs and the ledger that it is tracked on open a new avenue for income and digital exchange. A piece of art may be used to influence and derive another piece of art, divide into smaller pieces of that same art, and maintain public accessibility. NFTs and digitalized art can be used the same. Just as a physical piece of art can be used as a vehicle for monetary purposes, a tokenized art piece also be a vehicle for similar purposes. In an embodiment, an NFT may include an asset representing any form of physical or virtual art, such as a video, image, audio file, textual data, and the like thereof. In another embodiments, an NFT can include ownership of any physical or virtual asset such as tangible commodities, real-estate, collectables, and the like thereof. Aspects of the present disclosure can include decentralized platform that allows artists or creators to tokenize their assets into a NFTs to be added into a blockchain. The decentralized platform can also allow for artists to monetize their assets by monetary transactions of their NFTs. Aspects of the present disclosure can be used to price and determine the value of the NFTs on the blockchain. In an embodiment, a computing device can generate smart contracts that include royalty payment requirements to be sent to the artist of the asset identified by its respective NFT. In another embodiment, the computing device can allow artists to price their own assets.

Aspects of the present disclosure can be used to generate a user profile containing information about the user and its cryptographic assets. In an embodiment, a user can be associated with a plurality of user information such as demographic, age, educational history, employment history, driving record, family history, location, financial documents, tax returns, and the like thereof. This information can be entered or provided by the user. Aspects of the present disclosure can also receive NFTs that users already own and generate and/or update the user's profile. In an embodiment, a computing device may interact with an oracle device to verify the user information provided by a user. The oracle device may capture information regarding other users and their profiles. Aspects of the present disclosure can be used to operate on a blockchain, wherein the blockchain data can also include user information to verify the user and/or user profile.

Aspects of the present disclosure can also be used as a medium for cryptographic transfer and/or trading between users such as buyers, sellers, loaners, borrowers, and the like thereof. In an embodiment, a computing device may upload user information on a decentralized platform, marketplace, network, server, and the like thereof, to communicate with other users and their profiles. Aspects of the present disclosure can also be used to identify users based on user profiles. In an embodiment, each profile may be assigned a quantitative rating denoting the user's transaction reliability. For instance, a user who has a long history of successful cryptographic transactions may be given a higher score, making the user a popular party to engage transactions with. In another example, a user who has generated large profits from cryptographic transactions may also be given a higher score. Aspects of the present disclosure can also be used to broadcast user profiles on a decentralized marketplace. In another embodiment, a decentralized marketplace can allow buyers and sellers to connect. The decentralized marketplace can also connect borrowers and lenders. Aspects of the present disclosure can also generate a "smart contract" to facilitate complex transactions. In an embodiment, the decentralized marketplace can include a centralized storage used as a buffer and/or escrow for cryptographic assets, currencies, and the like thereof, as a transaction is being completed. Aspects of the present disclosure can also be used to identify to a user indicating a transaction request a potential provider that the user can transact with. In an embodiment, the potential provider can be identified by the user's assigned quantitative rating, wherein the potential provider is willing to transact with users of similar quantitative ratings. This is so, at least in part, to optimize the efficiency of successful interactions between users. Aspects of the present disclosure can also be used to identify a plurality of providers to a user, wherein the plurality of providers include a collective group with a collective pool of cryptographic assets to transact with the user.

Aspects of the present disclosure can be used to classify a tokenized user and/or user information as a capital generating unit. Users and/or their profiles can be tokenized as a vehicle for cryptographic transaction. Aspects of the present disclosure can be used to market, broadcast, promote, publicize, and the like thereof, users via NFTs on a decentralized marketplace. Users seeking capital can promote themselves to find lenders via the decentralized marketplace. For instance, because of the nature of NFTs, a wide range of possibilities is opened such as an NFT that utilizes subscription models. For example, with houses, subscription models would be tough to apply, because no one subscribes to owning a house (for the time being). However, an NFT can be composed of underlying assets that rely on subscription-based revenue. In an embodiment, a user that owns every one of Tom Brady's Official TD Super Bowl Passes may have paid $1000 to acquire all of them. Instead of allowing them to sit in the user's personal NFT collection, one could lend the collection to platforms or other individuals directly for a certain period of time in exchange for a fee. This fee could be a direct one-time fee from the user, or in the case of a platform, the platform charges a general subscription fee, and the user gets access to a wide arrange of collections. Each time the collection is selected or 'rented' by a customer; the original user gets a profit from the platform as the owner of the collection. In either case, the underlying benefit is the same, the NFT collection is now generating revenue. As an alternative example, 10 k people select the collection to display in their personal homes on game night—the NFTs are generating income or making money. From here, the user may decide to create an NFT and sell it. If the revenue generating collection (i.e., all the NFTs owned by the user that are making money) may net the user a specific income for a defined number of years, thus the user may decide to sell their collection. This may provide the user with an immediate monetary value which then offloads some of the risk of holding the collection. It may be possible that Tom Brady commits an act that diminishes the value of the asset. Customers may not want the NFTs, and the collection will be devalued. It may also be possible that To Brady is in the Super Bowl next year, in which case the collection may generate a higher monetary output that year due to higher demand. In some embodiments, the user may offload the risk to someone else for a cash payment.

Referring now to FIG. 1, an exemplary embodiment of an apparatus for cryptographic resource transfer regarding non-fungible tokens (NFTs) is illustrated. The apparatus includes a computing device 100. computing device may include any computing device as described in this disclosure, including without limitation a microcontroller, microprocessor, digital signal processor (DSP) and/or system on a chip (SoC) as described in this disclosure. Computing device 100 may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 100 may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. Computing device 100 may be implemented using a "shared nothing" architecture in which data is cached at the worker, in an embodiment, this may enable scalability of apparatus 100 and/or computing device.

With continued reference to FIG. 1, computing device 100 may be designed and/or configured to perform any method, method step, or sequence of method steps in any embodiment described in this disclosure, in any order and with any degree of repetition. For instance, the computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 100 includes a memory and at least a processor. The memory may include any memory as described in this disclosure. The memory may be communicatively connected to the at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. The memory may be configured to provide instructions to the at least a processor, which may include any processor as described in this disclosure.

In a non-limiting embodiment and still referring to FIG. 1, computing device 100 may be configured to perform or implement one or more aspects of a cryptographic system.

In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

With continued reference to FIG. 1, computing device 100 may include a decentralized platform 168 for which a computing device 100 may operate on. A "decentralized platform," as used in this disclosure, is an online platform and/or marketplace that enables secure data exchange between anonymous parties. In some non-limiting embodiments decentralized platform 168 may include a network and/or server of networks of computing devices. In another non-limiting embodiment decentralization refers to the transfer of control and decision-making from a centralized entity (individual, organization, or group thereof) to a distributed network. Decentralized platform 168 may be configured to reduce the level of trust that participants must place in one another and deter their ability to exert authority or control over one another in ways that degrade the functionality of decentralized network1 168. In some embodiments, apparatus 100 may include In a non-limiting embodiment and still referring to FIG. 1, decentralized platform 168 may be supported by any blockchain technologies. For example and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform 168 can make it is difficult if not impossible to discern a particular center. In some embodiments, decentralized platform 168 can include a decentralized ecosystem. Decentralized platform 168 may serve as an ecosystem for decentralized architectures such as an immutable sequential listing and/or blockchain.

With continued reference to FIG. 1, decentralized platform 168 may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform 168 may include an NFT marketplace. An "NFT marketplace" is a marketplace allowing uses to trade NFTs and upload them to an address. Decentralized platform 168 may act as any NFT marketplace such as, but not limited to, OpenSea, Polygon, FCTONE, The Sandbox, Crypt® Kitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace in the context of NFTs.

In a non-limiting embodiment, and still referring to FIG. 1, decentralized platform 168 may implement decentralized finance (DeFi). "Decentralized finance," as used in this disclosure, as financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

Figure 8:
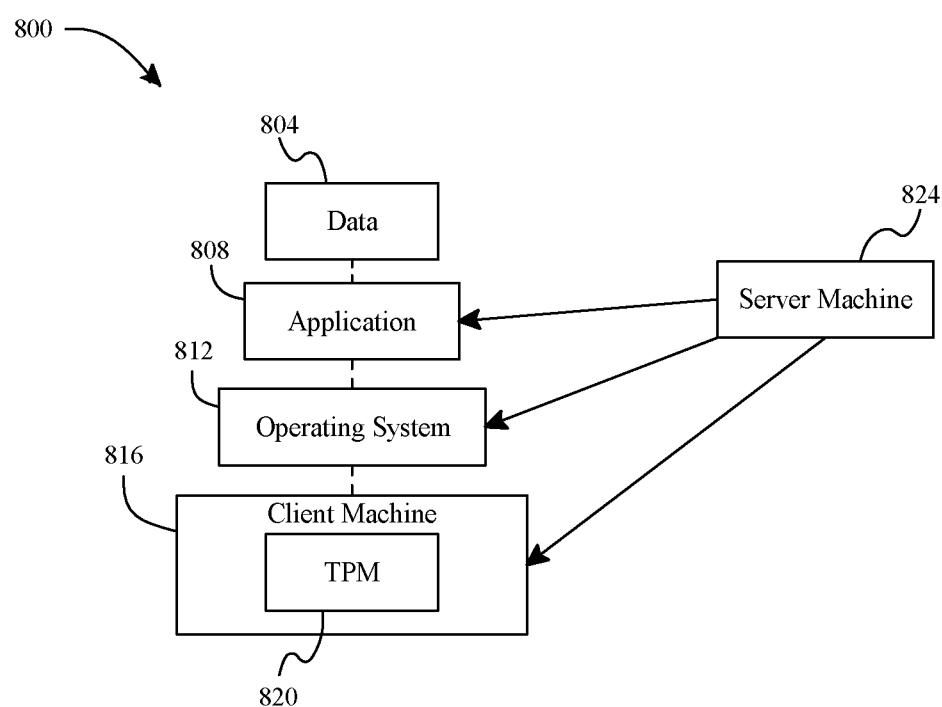
FIG. 8 is a block diagram of an exemplary embodiment of a trusted computing architecture.

In a non-limiting embodiment, and still referring to FIG. 1, decentralized platform 168 may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform 168 may enable communication between a plurality of computing devices, wherein it is built on a back-end of peer-to-peer, decentralized network of nodes (computing devices), the applications run on decentralized storage systems rather than centralized servers. In some embodiments, these nodes of computing devices may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or computing device 100 may be communicatively connected to an immutable sequential listing. Any digitally signed assertions on the immutable sequential listing may be configured to be confirmed by the World Computer. Alternatively or additionally, computing device 100 may be configured to store a copy of the immutable sequential listing into its memory. This is so, at least in part, to process a digitally signed assertion that has a better chance of being confirmed by the World Computer prior to actual confirmation. In a non-limiting embodiment, decentralized platform 168 may be configured to tolerate localized shutdowns or attacks; it is censorship-resistant. In another non-limiting embodiment decentralized platform 168 and/or cd 100 may incorporate trusted computing as shown in FIG. 8. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, computing device 100 is configured to receive a user profile 112. A "user profile," as used in this disclosure, is a digital representation of a user 104 containing user information for the viewing of an audience. In some non-limiting embodiments, user profile 112 may include a digital avatar, digital poster, digital advertisement, digital summary of a user, and the like thereof. In another non-limiting embodiment, user profile 112 may include a profile image, username, name of any group and/or club user 104 is associated with, and the like thereof. A "user," as used in this disclosure, is an entity that interacts with computing device 100 and/or decentralized platform 168. User 104 may include a user device, wherein the user device is any computing device as described herein and communicating with computing device 100 and/or decentralized platform 168 of the apparatus. In some non-limiting embodiments user 104 may communicate, via the user device, with computing device 100 to seek a cryptographic asset, cryptographic loan, and the like thereof. For example and without limitation, a user may want to borrow some asset and/or capital in a cryptographic form, wherein the apparatus of FIG. 1 enables the user to find other entities to conduct a sale, agreement, and/or transfer of assets and/or capital. The user may prefer to find a cryptographic asset such as an NFT as a capital generating vehicle instead of a fait currency. Person of ordinary skill in the art, upon reviewing the entirety of this disclosure, of the interactions between a user and the apparatus in the context of decentralized exchange of cryptographic resources.

With continued reference to FIG. 1, computing device 100 may operate decentralized platform 168, wherein computing device 200 includes a digital port enabling user 104 to submit their own user profile 112 to be displayed on decentralized platform 168. In a non-limiting embodiment, computing device 200 may be configured to generate user profile 112 as a function of user data 108. A "user data," as used in this disclosure, is any personal information about user 104 wherein certain personal information is not to be public on decentralized platform 168. For example and without limitation, user 104 may be required to submit personal information such as first name, last name, occupation, demographic information, age, income, statement of purpose, social security number, and the like thereof. Person of ordinary skill in the art, upon reviewing the entirety of this disclosure, will be aware of the various user related information in the context of generating a profile.

With continued reference to FIG. 1, computing device 100 may enable the use of cryptocurrency. "Cryptocurrency," as used in this disclosure, is a digital or virtual currency that is secured by cryptography, which makes it nearly impossible to counterfeit or double-spend. In some embodiments, cryptocurrencies are decentralized networks based on blockchain technology such as that of an immutable sequential listing that backs decentralized platform 168, wherein the immutable sequential listing is enforced by a network of computing devices called nodes. In some embodiments, computing device 100 may accept fiat money such as paper money. In some embodiments, computing device 100 may allow various types of cryptocurrencies such as Ethereum (ETH), Litecoin (LTC), Cardano (ADA), Polkadot (DOT), Bitcoin Cash (BCH), Stellar (XLM), and the like thereof. Persons skilled in the art, upon reviewing the entirety of this disclosure, will be aware of the various embodiments of different types of money, currency, and/or asset for purposes as described herein.

With continued reference to FIG. 1, computing device 100 may include a digital port enabling user 104 to connect a digital wallet to an NFT-supported system such as decentralized platform 168 and/or computing device 100. A "digital wallet," as used in this disclosure, is a software-based system that securely stores payment information and passwords of user 104 for numerous payment methods and websites. By using a digital wallet, user 104 can complete purchases easily and quickly with near-field communications technology. In a non-limiting embodiment, decentralized platform 168 may include a web interface enabling participating entity 132 to deposit digital assets including, but not limited to fiat currency, cryptographic currency, and the like thereof. In some embodiments, computing device 100 may include a third party and/or enable a third party called "miners" to perform the minting process of a transaction. Persons skilled in the art, upon reviewing the entirety of this disclosure, will be aware of the various embodiments of minting and mining in the context of secure transactions.

With continued reference to FIG. 1, user profile 112 may include and/or may be linked to a cryptographic security 116. A "cryptographic security," as used in this disclosure, is a cryptographic asset owned by user 104, wherein the asset is used as a collateral. In some non-limiting embodiments cryptographic security 116 may include cryptocurrency. Alternatively and additionally, cryptographic security 116 may include some fiat currency, wherein the fiat currency is used for any trade and/or sale regarding cryptographic assets. Cryptographic security 116 may include an NFT such as a user-backed NFT 172. A "user-backed NFT," as used in this disclosure, is an NFT owned by a user, wherein the NFT is primarily used as a collateral. For instance and without limitation, user-backed NFT 172 and/or any NFT as described herein may be consistent with the NFT in U.S. patent application Ser. No. 17/586,256, and entitled, "APPARATUS FOR PROPORTIONAL CALCULATION REGARDING NON-FUNGIBLE TOKENS," which is incorporated by reference herein in its entirety. In some non-limiting embodiments, user-backed NFT 172 may include an NFT as further described in FIG. 7. In some non-limiting embodiments an NFT may be associated with reproducible digital files such as photos, videos, and audio. NFTs may also be associated with physical assets such as real estate, collectables, and other commodities. In a non-limiting embodiment, user 104 may create a virtual asset such as a digital artwork, animation video, game, and the like thereof, to be used as a collateral. User 104 may also create a physical asset such as a painting, live-action video, toys, or the like. In some non-limiting embodiments, user 104 may "tokenize" such assets to be stored on a digital ledger and/or immutable sequential listing, which may ensure non-duplicability and ownership, generate income, and/or enable accessibility of the assets. In another non-limiting embodiment computing device 100 may receive the virtual asset from user 104 and convert it to and/or generate a cryptographic asset such as user-backed NFT 172. Persons skilled in the art, upon reviewing the entirety of this disclosure, will be aware of the various embodiments and purposes of tokenizing an asset. As used in this disclosure, "tokenization" is the process of substituting a sensitive data element with a non-sensitive equivalent, referred to as a token, that has no extrinsic or exploitable meaning or value. A "cryptographic asset," as used in this disclosure, is a transferable digital representation designed in a way that prohibits its copying or duplication. In a non-limiting embodiment, computing device 100 may include components to facilitate the transfer of cryptographic assets via some distributed ledger technology such as an immutable sequential listing, wherein the immutable sequential listing is further described in FIG. 5. In some non-limiting embodiments, user 104 may not have any cryptographic securities to be used as collateral. Computing device 100 may enable user 104 to tokenize any digital and/or virtual asset into a cryptographic asset such as a user-backed NFT. Alternatively or additionally, user 104 may use any cryptocurrency as a collateral instead of a user-backed NFT.

With continued reference to FIG. 1, computing device 100 may convert cryptographic security 112 and/or user-backed NFT 172 into a locked payment. A "locked payment," as used in this disclosure, is a payment that a paying party is committed to but may only be processed upon a contingent event occurring. Thus, once a locked payment has been posted, it may be irrevocable for the payer that posts it, but unavailable to the recipient device until the latter has performed an action upon which unlocking the payment is contingent. As a non-limiting example, a locked payment may include a zero-knowledge contingent payment. A "zero-knowledge contingent payment," as used in this disclosure, is a payment that is posted in a non-spendable form, which may be converted to a spendable form by provision of an element of data. A proprietor and/or community operating some immutable sequential listing may require a secure proof, a password, or other provision of datum and/or proof of performance of a given process as a condition for a valid expenditure of value in the zero-knowledge contingent payment. In an embodiment, computing device 100 may create a locked payment as good-faith bond, for instance to insure against the possibility of loss of data or the like; locked payment may be released upon failure of computing device 100 to demonstrate storage of data. For example and without limitation, user 104 may offer cryptographic security 116 to another user that provides to user 104 a desired asset as a loan, wherein a contract between the two users is established. In the event user 104 fails to comply to the terms and agreements underlined within the contract, computing device 100 keep cryptographic security 116 and transfer it to a digital wallet of the user who issued the loan to user 104. In another non-limiting example, if the loaner fails to comply with the terms and agreements underlined within the contract, computing device 100 may return the locked payment of cryptographic security 116 back to user 104 as a result. Computing device 100 may also lock the loaner's asset and return it back to the loaner while user 104 may keep any capital gained form the use of the loaner's asset. Person of ordinary skill in the art, upon reviewing the entirety of this disclosure, of the various embodiments of a locked payment and transfer in the context of secure cryptographic exchange through a decentralized exchange platform. A "cryptographic exchange," as used in this disclosure, is any action, process, and/or protocol of providing a cryptographic resource and returning a cryptographic resource through the facilitation of a decentralized platform. Person of ordinary skill in the art, upon reviewing the entirety of this disclosure, will be aware of the various elements of an exchange in the context of decentralized cryptographic exchange.

In some non-limiting embodiments, and still referring to FIG. 1, computing device 100 may receive cryptographic security 116 and/or user-backed NFT 172, wherein the computing device 100 may store cryptographic security 116 and/or user-backed NFT 172 into an escrow account such as a conditional wallet. The conditional wallet is further described in FIG. 2. In some non-limiting embodiments computing device 100 may generate a locked payment trigger 176 to be assigned to cryptographic security 116 and/or user-backed NFT 172. A "locked payment trigger," as used in this disclosure is a conditional trigger that enables the cryptographic security 116 and/or user-backed NFT 172 to be returned back to user 104. For example and without limitation, for a contract between user 104 and a loaner to be complete, locked payment trigger 176 may be activated to conclude the contract and return the collateral that is cryptographic security 116 back to user 104 and return the loaned asset from user 104 and back to its original owner. Persons skilled in the art, upon reviewing the entirety of this disclosure, will be aware of the various embodiments of payments and transactional steps in the context of cryptographic assets.

In a non-limiting embodiment, and still referring to FIG. 1, the locked payment may include a timeout. A "timeout," as used in this disclosure, is a time limit contingent with locked payment trigger 176. For example and without limitation, computing device 100 may generate locked payment trigger 176 and/or convert cryptographic security 116 and/or user-backed NFT 172 into a locked payment, wherein the locked payment status is to be canceled and/or removed from once the time limit denoted by the timeout is reached. In another non-limiting embodiment, computing device 100 may broadcast user profile 112 on decentralized platform 112, wherein user profile 112 may include a short description of the user's cryptographic security 116 for potential buyers/loaners to accept, wherein the broadcast of user profile 112 is based on the timeout. If no buyer/loaner is found before the timeout is reached, computing device 100 may close the broadcasting of user profile 112. Person of ordinary skill in the art, upon reviewing the entirety of this disclosure, will be aware of the various embodiments and purposes of a timer in the context of broadcasting an asset.

With continued reference to FIG. 1, user profile 112 includes a user digest 120. A "user digest," as used in this disclosure, is a record, history, account, or the like thereof, describing a plurality of sales, trades, transactions, interactions, or the like thereof, user 104 has conducted. In some non-limiting embodiments user digest 120 may include a summary of the record, history, and/or account. Computing device 100 may generate user digest 120 by recording every sale, trade, transaction, interaction, or the like thereof, of user 104 into user digest 120. Computing device 100 may broadcast user profile 112 with user digest 120 to provide a summary of the historical transactions user 104 has conducted. This is so, at least in part, to advertise user 104 and/or user profile 112. For instance, a user with a long history of compliant trades, sales, and/or transactions, may encourage other users to conduct trades with that user. A user with a long history of poor interactions and/or trades may discourage other users from conducting trades with that user. In some non-limiting embodiments, computing device 100 may perform some quantitative assessment of the contents of user digest 120 to generate some quantifiable identifier denoting the quality and/or successfulness of user 104 as a marketing, advertising, and/or promoting vehicle. Person of ordinary skill in the art, upon reviewing the entirety of this disclosure, of the various embodiments of a record of a user's transactions in the context of marketability.

With continued reference to FIG. 1, user profile 112 includes a temporal resource request 124. A "temporal resource request," as used in this disclosure, is a conditional denoting a user's desire to perform a cryptographic exchange. A "cryptographic exchange," as used in this disclosure, is any form of exchange involving cryptographic assets. In some non-limiting embodiments, a cryptographic exchange may include a buy, sell, trade, borrow, loan, or the like thereof, wherein the principal asset is a cryptographic asset. Temporal resource request 124 may be contingent on a timeout as described herein. For example and without limitation, computing device 100 may broadcast temporal resource request 124 on decentralized platform 168, informing other entities and/or users connected to decentralized platform 168 that user 104 is requesting a cryptographic exchange. In some non-limiting embodiments temporal resource request 124 may include a trigger indicating computing device 100 to broadcast user profile 112 and/or temporal resource request 124 on decentralized marketplace. Person of ordinary skill in the art, upon reviewing the entirety of this disclosure, of the various embodiments of a communication request in the context of cryptographic exchange.

With continued reference to FIG. 1, user profile 112 may include a collective entity request condition 128. A "collective entity request condition," as used in this disclosure, is a preferential request and/or trigger instructing computing device 100 the type of cryptographic exchange partner that user 104 desires to conduct a cryptographic exchange with. A "cryptographic exchange partner," as used in this disclosure, is any user, device, entity, or the like thereof, for a user and/or a resource-backed entity to conduct a cryptographic exchange with. For example and without limitation, a cryptographic exchange partner may include a single entity and/or user for user 104 to conduct a cryptographic exchange with. In another example without limitation, a cryptographic exchange partner may include an entity comprising a plurality of entities and/or users to conduct a cryptographic exchange with. In a non-limiting embodiment, collective entity request condition 128 may be contingent on a timeout. For instance, user 104 may desire to seek a single entity and/or user as a cryptographic exchange partner which is denoted by collective entity request condition 128. If the single entity and/or user is identified within a specific allotted time period denoted by the timeout, computing device 100 may switch the condition of collective entity request condition 128 to seek a larger grouped entity comprising of multiple users and/or entities and vice versa. Person of ordinary skill in the art, upon reviewing the entirety of this disclosure, will understand the preferential feature used in the context of decentralized exchange.

With continued reference to FIG. 1, computing device 100 may include and/or incorporate an oracle device 132. An "oracle device," as used in this disclosure, is a device and/or entity that connects a decentralized entity such as a blockchain, an immutable sequential listing, and/or a decentralized platform to computing device 100, thereby enabling smart contracts such as locked payment trigger 176 and/or any conditional trigger to execute based upon inputs and outputs from an external data 136. In a non-limiting embodiment, oracle device 132 may include, an input oracle, an output oracle, cross-chain oracle, compute-enabled oracle, and the like thereof. Oracle device 132 may utilize secure off-chain computation to provide decentralized services that are impractical to do on-chain due to technical, legal, or financial constraints, such as using Keepers to automate the running of smart contracts when predefined events take place, computing zero-knowledge proofs to generate data privacy, or running a verifiable randomness function to provide a tamper-proof, and provably fair source of randomness to smart contracts. Person of ordinary skill in the art, upon reviewing the entirety of this disclosure, of the various embodiments of an oracle device for purposes as described herein.

With continued reference to FIG. 1, an "external data," as used in this disclosure, is a collection of information obtained from the outside world such as an online interfacing website and search behavior within decentralized platform 168. In a non-limiting embodiment, external data 136 may include any information updates to user profile 112 that was updated by user 104 and not previously verified with blockchain technology and/or by an immutable sequential listing. In some non-limiting embodiments, computing device 100 may detect such inputs and/or updates and record them in a user behavior database 164. A "user behavior database," as used in this disclosure is a local and/or cloud data storage system used to store user activity, information, behavior, and the like thereof, regarding decentralized platform 168 and/or computing device 100.

In some non-limiting embodiments, and still referring to FIG. 1, a database may be implemented, without limitation, as a relational database, a key-value retrieval database such as a NOSQL database, or any other format or structure for use as a database that a person skilled in the art would recognize as suitable upon review of the entirety of this disclosure. A database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Person of ordinary skill in the art, upon reviewing the entirety of this disclosure, of the various embodiments of a database and/or data storage structure and/or system for purposes as described herein.

With continued reference to FIG. 1, external data 136 may include information regarding current events related to NFTs, NFT trends, and the like thereof. For example and without limitation, computing device 100 may interact with oracle device 132 such as an input oracle to verify the occurrence of insurable events during claims processing, opening up access to physical sensors, web APIs, satellite imagery, and legal data. An output oracle may be utilized to provide computing device 100 with a way to make payouts on claims using other blockchains or traditional payment networks. In some non-limiting embodiments, external data 136 may include profiling data. "Profiling data," as used in this disclosure, is information gleaned from a user's use of a website such as decentralized platform 168. Profiling data may feed computing device 100 information to better find a preferred cryptographic exchange partner for user 104. In some non-limiting embodiments, oracle device 132 can find outside information that helps facilitate a smart contract execution (e.g. measure inflation for revenue generating, converting different fiat currencies, offsetting value of the loan based on the publicity/utility of it by the user). Person of ordinary skill in the art, upon reviewing the entirety of this disclosure, will understand the collecting of external information for informing secure decentralized blockchain technology.

In some non-limiting embodiments and still referring to FIG. 1, computing device 100 may generate and/or update user profile 112 as a function of a user chain data 140. A "user chain data," as used in this disclosure, is any user data involved in any cryptographic exchange and/or transaction recorded on any blockchain such as an immutable sequential listing. Computing device 100 may use user chain data 140 to create a more robust user profile 112. In some non-limiting embodiments, computing device 100 may compile user data 108, user chain data 140, and/or external data 136 to cross check each other to update and/or generate user profile 112. In some non-limiting embodiments, computing device 100 may receive user chain data 140 from a cryptographic entry database 160. A "cryptographic entry database," as used in this disclosure, is any local and/or cloud database and/or data storage structure and/or system used to store transactional data, block data, and/or entry data of an immutable sequential listing. For instance, computing device 100 may receive a copy of the immutable sequential listing and/or access a copy of the immutable sequential listing from its memory to record, store, and/or retrieve user data linked to any cryptographic entry and/or transaction via the immutable sequential listing into cryptographic entry database 160. This is so, at least in part, to retrieve user data linked to an immutable sequential listing transaction from a localized and/or cloud data storage structure instead of the immutable sequential listing. Person of ordinary skill in the art, upon reviewing the entirety of this disclosure, will be aware of the various types of information from various sources in the context of cryptographic exchange.

With continued reference to FIG. 1, computing device 100 is configured to determine a predictive quantifier 152 of user profile 112 and/or user 104. A "predictive quantifier," as used in this disclosure, is a quantitative value indicating a user's current and/or future successfulness as a seller, buyer, borrower, or the like of, using a cryptographic resource as a capital generating vehicle. In some non-limiting embodiments, predictive quantifier 152 may include a rating, wherein a high rating of user 104 indicates user 104 as a successful capital generating vehicle. A low rating may indicate user 104 as a poor performing capital generating vehicle. In some non-limiting embodiments, predictive quantifier 152 may indicate the likelihood of user 104 will generate capital using a cryptographic resource. In some non-limiting embodiments, computing device 100 may generate predictive quantifier 152 based on the contents and/or information provided by user 104 and/or user profile 112. Computing device 100 may assign predictive quantifier 156 to user profile 112 and broadcast them, wherein predictive quantifier 152 is used as a primary metric of identifying and/or attracting potential cryptographic exchange partners. Person of ordinary skill in the art, upon reviewing the entirety of this disclosure, will understand of the various embodiments of a quantitative metric used to classify a user in the context of cryptographic exchange.

With continued reference to FIG. 1, computing device 100 may generate predictive quantifier 152 using a quantifier machine-learning model 144. A "quantifier machine-learning model," as used in this disclosure, is any machine-learning model, process, and/or algorithm used to receive user profile 112 and/or any user related information about user 104 as an input to output predictive quantifier 152. Computing device 100 may train quantifier machine-learning model 144 using a quantifier training set 148. A "quantifier training set," as used in this disclosure, is a training data containing an element of user data correlated to a resource output. An "element of user data," as used in this disclosure is a piece of data similar to user data 108 such as that of a different user. A "resource output," as used in this disclosure, is a capital and/or revenue return based on the use of any cryptographic resource used by a user. In some non-limiting embodiments quantifier machine-learning model 144 may receive user digest 120 and analyze a total history of transactions and/or usage of a cryptographic resource. In some non-limiting embodiments quantifier training set 148 may include elements of user chain data 140. Computing device 100 may retrieve and store quantifier training set 140 and/or elements of quantifier training set 148 in user behavior database 164. Person of ordinary skill in the art, upon reviewing the entirety of this disclosure, will understand the various embodiments of a machine-learning and training data in the context of generating a quantitative value for purposes as described herein.

With continued reference to FIG. 1, computing device 100 may be configured to generate a quantitative potential classification 156 as a function of predictive quantifier 156. A "quantitative potential classification," as used in this disclosure, is a category denoting a group of other user profiles that have a shared quantitative metric such as predictive quantifier 152. In a non-limiting embodiment, computing device 100 may categorize a plurality of users and/or user profiles into various categories describing their predictive quantifiers. For instance, computing device 100 may generate a tier system wherein users and/or user profiles which predictive quantifiers over a specific minimum threshold value fall into a tier one level, indicating that those users and/or user profiles have the highest ratings and/or predictive quantifiers as capital generating vehicles. In a non-limiting embodiment, computing device 100 may group a plurality of users and/or user profiles to match them to a plurality of potential cryptographic exchange partners based on quantitative potential classifications of the plurality of users and/or user profiles. In another non-limiting embodiment, computing device 100 may broadcast user profile 112 with predictive quantifier 152 and quantitative potential classification 156.

In some non-limiting embodiments and still referring to FIG. 1, quantitative potential classification 156 may be generated using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 100 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Person of ordinary skill in the art, upon reviewing the entirety of this disclosure, will be aware of the various levels and/or tiers of classification in the context of cryptographic exchange.

Figure 2:
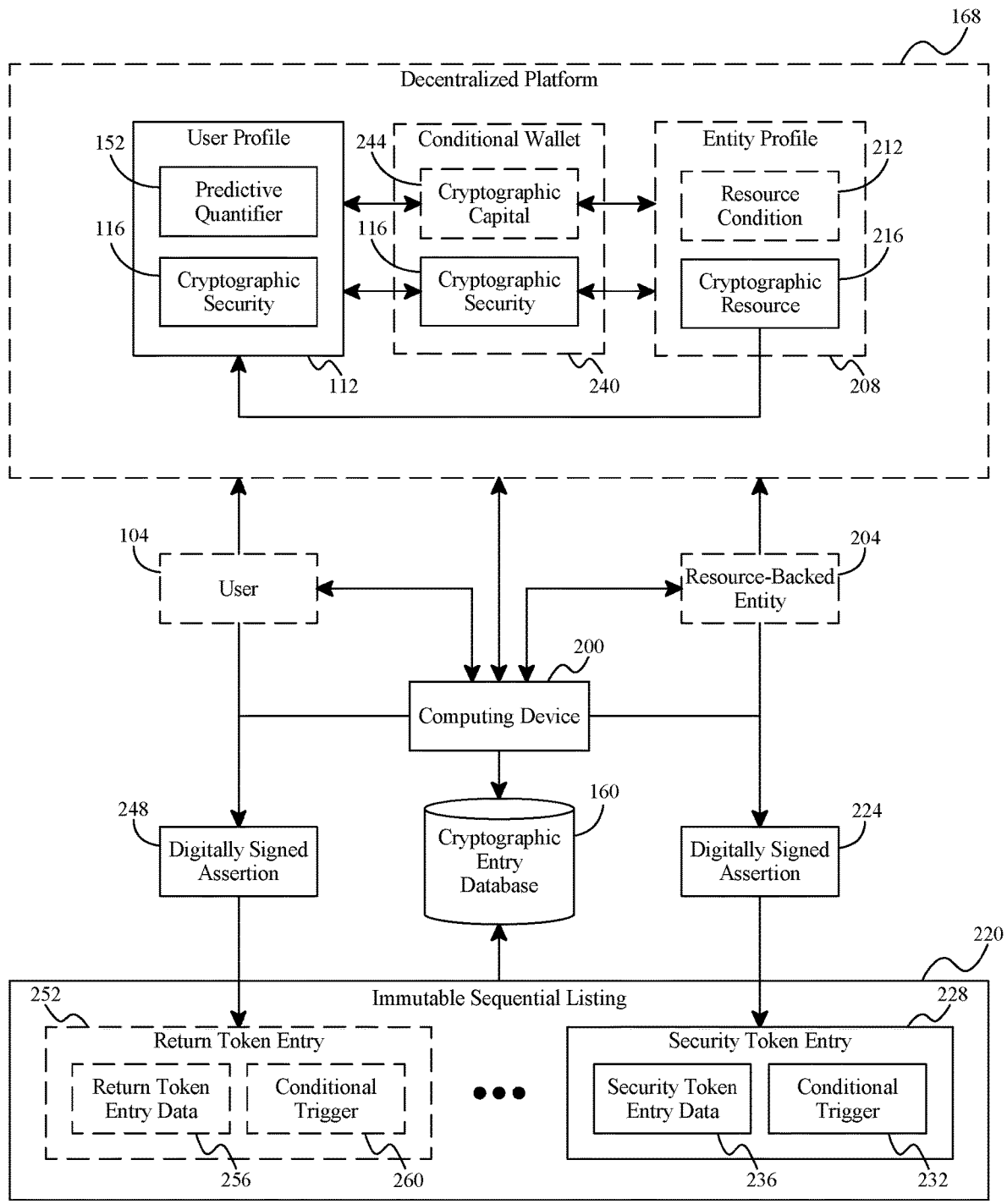
FIG. 2 is a block diagram of an exemplary embodiment of an individual cryptographic transfer regarding non-fungible tokens.

Referring now to FIG. 2, a block diagram of an exemplary embodiment of an individual cryptographic transfer regarding non-fungible tokens is illustrated. Computing device 200 is further configured to identify a resource-backed entity 204 to the user as a function of predictive quantifier 152 and/or quantitative potential classification as described above. Computing device 200 may be consistent with any computing device as described herein. A "resource-backed entity," as used in this disclosure, is any entity, user, and/or device communicating with decentralized platform 168 that may accept a temporal resource request of user 104 using the resource-backed entity's cryptographic resource 216 as a capital generating asset. In a non-limiting embodiment, resource-backed entity 204 may identify user 104 and/or user profile 112 via decentralized platform 168. In another non-limiting embodiment, computing device 200 may identify and/or broadcast user 104 to resource-backed entity 204 based on predictive quantifier 152. For instance, resource-backed entity 204 may seek to find a user to loan its cryptographic resource 216 as an investment to the user for a potential and/or profitable return of capital. In some non-limiting embodiments, computing device 200 may generate a user profile similar to that of user profile 112 of user 104 as an online entity to be broadcasted on decentralized platform 168 to facilitate interactions and/or transactions between users such as buyers, sellers, traders, borrowers, lenders, or the like thereof, using cryptographic resources as a principal asset. Similar to generating user profile 112, computing device 200 may generate an entity profile 208. An "entity profile," as used in this disclosure, is any profile to be broadcasted on an online platform such as decentralized platform 168 associated with a resource-backed entity. In some non-limiting embodiments, computing device 200 may generate a quantifiable value for the entity profile 208 of resource-backed entity 204 to also identify a potential cryptographic exchange partner based on the quantifiable value of resource-backed entity 204 and predictive quantifier 152 of user 104. The quantifiable value for resource-backed entity 204 may be determined by a digest containing historical records of resource-backed entity 204 as a cryptographic exchange partner similar to a user digest of user profile 112 and/or user 104. In a non-limiting embodiment, computing device 200 may filter out a plurality of user profiles with temporal resource requests based on the preferences of resource-backed entity 204. For instance, resource-backed entity 204 may seek potential cryptographic exchange partners with high earning potential denoted by predictive quantifier 152 and/or a quantitative potential classification. Person of ordinary skill in the art, upon reviewing the entirety of this disclosure, will be aware of the various embodiments of a profile for resource-backed entities for purposes as described herein.

With continued reference to FIG. 2, a "cryptographic resource," as used in this disclosure, is a cryptographic asset used as a loan to be given to a recipient. Cryptographic resource 216 may include any NFT, cryptocurrency, and/or any cryptographic asset as described in the entirety of this disclosure. Cryptographic resource 216 may be contingent to a resource condition 212. A "resource condition," as used in this disclosure, is a requirement and/or set of requirements containing terms and/or guidelines to comply for a cryptographic exchange partner regarding the usage of a cryptographic resource as a loan. In some non-limiting embodiments, resource condition 212 may include a contract and/or smart contract denoted by a conditional trigger. For example and without limitation, resource condition 212 may include that user 104 is to return a royalty payment and/or percent of any capital generated during a specified period of time. Person of ordinary skill in the art, upon reviewing the entirety of this disclosure, will be aware of the various types of agreements for issuing a loan in the context of decentralized cryptographic exchange.

With continued reference to FIG. 2, computing device 200 may generate a security token entry 228 as a function of resource-backed entity and user 104 agreeing to conduct a cryptographic exchange. A "token entry," as used in this disclosure, is an entry containing any transaction data to be deployed on an immutable sequential listing, wherein the token entry is to be verified by the nodes and participants of the immutable sequential listing as a function of digitally signed assertions. The immutable sequential listing, as described in the entirety of this disclosure, is further described in FIG. 5. In some non-limiting embodiments, computing device 200 may store any token entry data in cryptographic entry database 160. A "security token entry," as used in this disclosure, is any token entry describing an initial transaction such as an agreement wherein a resource-backed entity accepts a user's temporal resource request, and the user accepts a resource-backed entity's resource condition. Alternatively and additionally, computing device 200 may be configured to generate a state channel.

A "state channel," as used in this disclosure, is a technique designed to allow users to make multiple blockchain transactions such as state changes or money transfers, without committing all of the transactions to the blockchain. For instance and without limitation, in the traditional state channel, only two transactions are added to a blockchain such as immutable sequential listing 220, but an infinite or almost infinite number of transactions can be made between the participants such as user 104 and resource-backed entity 204. The two transactions may include a conditional trigger 232 and conditional trigger 260. The infinite or almost infinite number of transactions may include the transactions resulting from any cryptographic exchange such as a cryptographic capital 244, cryptographic security 116, and/or cryptographic resource 216. Transactions may also include any verification of any data as described herein. Such infinite or almost infinite number of transactions may be recorded in in cryptographic entry database 160. In a non-limiting embodiment, the state channel may include a payment channel, wherein the payment channel is configured to facilitate transfer of monetary resources associated with a transaction. Alternatively and additionally, a state channel may include a smart-contract that enforces predefined rules for off-chain transactions. Each transaction creates a new state based on the previous state, signed by each party, which is cryptographically provable on the blockchain. Every new state makes the last state invalid since the smart contract acknowledges only the highest state as a valid state. In a non-limiting embodiment, a state channel may include a unidirectional channel and/or a bidirectional channel. Person of ordinary skill in the art, upon reviewing the entirety of this disclosure, of the various embodiments of a state channel its transactions for purposes as described herein.

With continued reference to FIG. 2, a "smart contract," as used in this disclosure, is an algorithm, data structure, program, and/or a transaction protocol which automatically executes, controls, documents, and/or records legally relevant events and actions according to the terms of a contract or an agreement. Objectives of smart contracts may include reduction of need in trusted intermediators, arbitrations and enforcement costs, fraud losses, as well as the reduction of malicious and accidental exceptions. In a non-limiting embodiment, computing device 200 may generate a smart contract based on resource condition 212 to be verified and/or validated via immutable sequential listing 220 by at least user 104, resource-backed entity 204, and/or any minimum number of nodes associated with immutable sequential listing 220. In another non-limiting embodiment, computing device 200 may generate security token entry 228 containing a smart contract denoted by conditional trigger 232. A "conditional trigger," as used in this disclosure, is an occurrence and/or condition which, once are met, deploys an update involving a token entry on immutable sequential listing 220. In some non-limiting embodiments, conditional trigger 232 may include a smart contract. For instance and without limitation, the conditional trigger may be consistent with any conditional trigger as described in U.S. patent application Ser. No. 17/586,256. In a non-limiting embodiment, each token entry and its associated smart contract can contain a plurality of conditional triggers. In some non-limiting embodiments, a conditional trigger may include elements defining conditions, rules and/or terms to be met to enable a smart contract to deploy any token entry on immutable sequential listing 220. For instance, for each token to be recognized and added on immutable sequential listing 220, a conditional trigger of a smart contract may include a requirement that a user returns a minimum capital amount and a borrowed cryptographic resource back to a resource-backed entity. Another example of a conditional trigger may include a condition that the borrowed cryptographic resource is returned at an expiration of a specific time period. Person of ordinary skill in the art, upon reviewing the entirety of this disclosure, will be aware of the various embodiments of conditional triggers in the context of satisfying a smart contract for purposes as described herein.

With continued reference to FIG. 2, any conditional trigger may enable any token entry on immutable sequential listing 220 as a function of a digitally signed assertion. A digitally signed assertion, as described herein, is further described in FIG. 5. In some non-limiting embodiments, the digitally signed assertion includes a secure proof. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 2, a digitally signed assertion may include a digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 2, once conditional trigger 232 has been approved as a function of a digitally signed assertion, computing device 200 may enable a cryptographic transfer. A "cryptographic transfer," as used in this disclosure, is an element of cryptographic exchange such as transferring one cryptographic asset to another entity, user, or device, or the like thereof. Computing device 200 may include a digital wallet such as a conditional wallet 240. A "conditional wallet," as used in this disclosure, is a device such as a centralized digital wallet used by computing device 200 to temporarily store contingent cryptographic assets during a cryptographic exchange, wherein the contingency of the cryptographic assets is governed by a resource condition and/or a conditional trigger. In a non-limiting embodiment, conditional wallet 240 may include a digital escrow account. For instance, computing device 200 may receive cryptographic security of user 104 and store it in conditional wallet 240. Resource-backed entity 204 may also simultaneously send a cryptographic transfer of cryptographic resource 216 to user 104 through decentralized platform 168. During the duration that user 104 is required to return a cryptographic capital 244 and/or cryptographic resource 216 back to resource-backed entity 204 as a function of complying and/or fulfilling resource condition 212, computing device 200 may store cryptographic capital 244 and/or cryptographic security 116 until then. A "cryptographic capital," as used in this disclosure, is any resource, capital, asset, income, fiat currency, cryptocurrency, revenue, profit, or the like thereof, during the initiation of a cryptographic exchange between a user and resource-backed entity until its completion, wherein the cryptographic capital is generated directly and/or indirectly by the usage of cryptographic resource 216. For example and without limitation, user 104 may also loan out cryptographic resource 216 at a higher price to generate a profit to comply with resource condition 212. In another example without limitation, user 104 may market cryptographic resource 216 by promoting its intrinsic value to generate income. In another example without limitation, user 104 may use cryptographic resource 216 for an advertisement. User 104 may also use its own influence to advertise cryptographic resource 216 on another platform and use advertising revenue to comply with resource condition 212. Person of ordinary skill in the art, upon reviewing the entirety of this disclosure, will be aware of the various embodiments of cryptographic capital in the context of cryptographic exchange and/or loan.

With continued reference to FIG. 2, once the expiration of the loan of cryptographic resource 208 is reached and/or resource condition 212 is completely complied, computing device 200 may generate a return token entry 252. A "return token entry," as used in this disclosure, is a final token entry denoting a final transaction data of a final cryptographic transfer that concludes a cryptographic exchange and/or contract between a user and a resource-backed entity. For instance, the final transaction can include computing device 200 to return cryptographic security 116 back to user 104 from conditional wallet 240 and transfer an agreed upon capital such as cryptographic capital 244 denoted by resource condition 212 to entity profile 208. In some non-limiting embodiments, user 104 may generate more cryptographic capital as required by resource condition 212, wherein user 104 may keep the outstanding cryptographic capital. In some non-limiting embodiments, a final transaction may include a termination of the cryptographic exchange between user 104 and resource-backed entity 204 in the event either party is responsible for inappropriate behavior. An "inappropriate behavior," as used in this disclosure, is any behavior conducted by any party involved in a cryptographic exchange such as a user, resource-backed entity, and/or outside hacker that does not comply with resource condition 212. In the event of an inappropriate behavior is detected and/or reported by computing device 200, user 204, and/or resource-backed entity 204, computing device 200 may conclude the cryptographic exchange by return all assets to its original owners such as cryptographic security 116 to user 104 and cryptographic resource 216 to resource-backed entity 204. Computing device 200 may also retain any pending cryptographic capital 244 within conditional wallet 240 and lock it. Person of ordinary skill in the art, upon reviewing the entirety of this disclosure, will be aware of the various embodiments denoting a concluding transaction in the context of a cryptographic exchange.

With continued reference to FIG. 2, computing device 200 may generate return token entry 252, wherein return token entry 252 includes a return token entry data 256. A "return token entry data," as used in this disclosure, is any token entry data describing a final transaction such as a final cryptographic transfer. Return token entry data 256 may include data describing the events of a final cryptographic transfer and/or exchange such as a successful exchange, unsuccessful exchange, or the like thereof. In a non-limiting embodiment, computing device 200 may store return token entry data 256 in cryptographic entry database 160. Return token entry 252 may include a conditional trigger 260. Conditional trigger 260 may include any conditional trigger as described herein. Alternatively and additionally, conditional trigger 260 may include a conditional trigger indicating the final transaction of a state channel. Return token entry 252 may be deployed on immutable sequential listing 220 as a function of a digitally signed assertion 248, wherein digitally signed assertion 248 is used to activate conditional trigger 260 and complete the deployment of return token entry on immutable sequential listing 220. Person of ordinary skill in the art, upon reviewing the entirety of this disclosure, will be aware of the various embodiments of a concluding cryptographic transfer in the context of blockchains.

With continued reference to FIG. 2, once a cryptographic exchange and/or final cryptographic transfer indicating a conclusion of the cryptographic exchange is completed, computing device 200 may update the user digest of user 102 and/or user profile 152. Computing device 200 may also update a digest of resource-baked entity 204 and/or entity profile 208. Depending on the success and/or failure to comply to resource condition 212, computing device 200 may update each digest of involving parties accordingly. In a non-limiting embodiment, computing device 200 may update the digests based on return token entry data 236. Person of ordinary skill in the art, upon reviewing the entirety of this disclosure, will be aware of the various factors that may update a user's and/or entity's digest for purposes as described herein.

Figure 3:
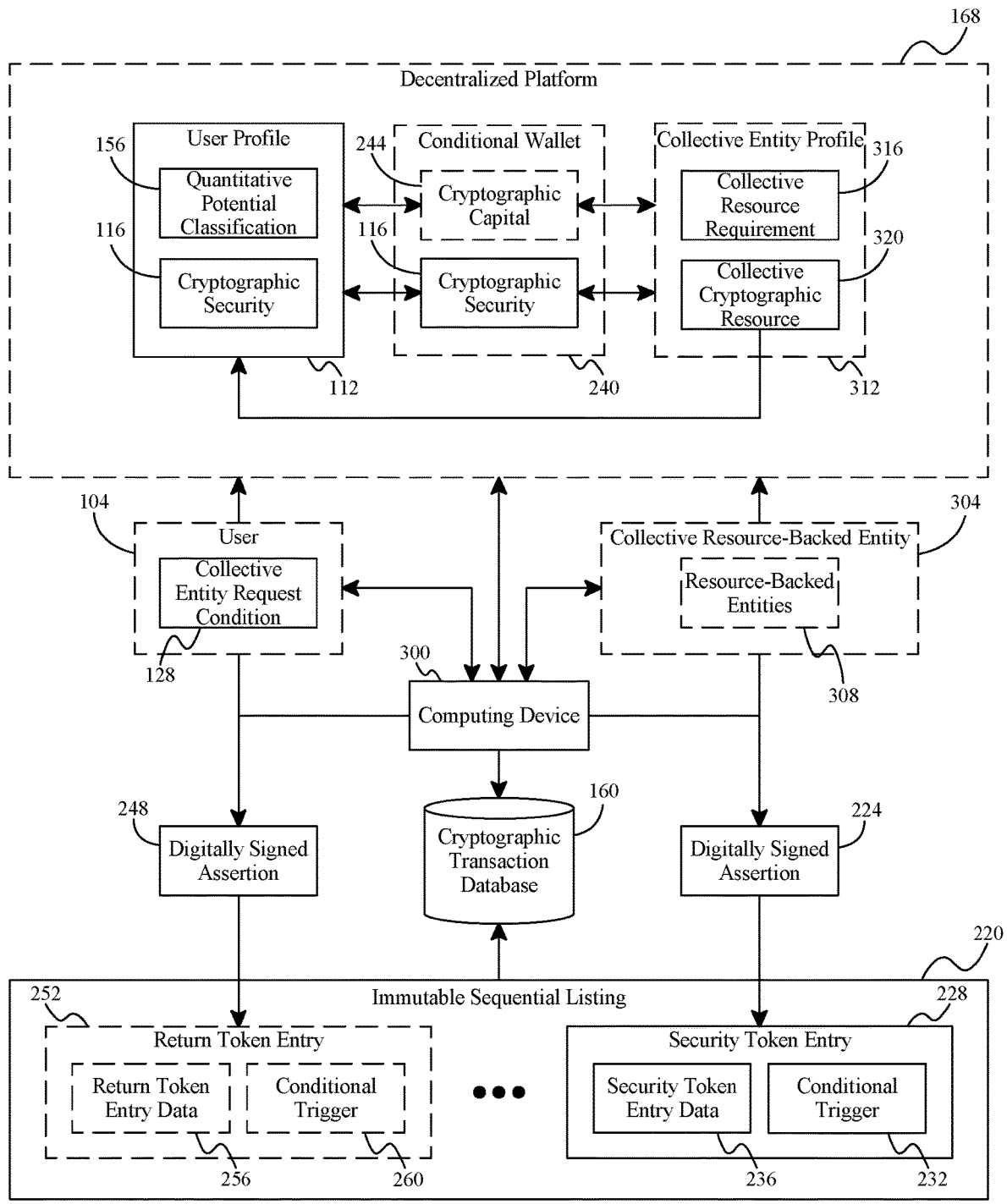
FIG. 3 is a block diagram of an exemplary embodiment of a collective cryptographic transfer regarding non-fungible tokens.

Referring now to FIG. 3, a block diagram of an exemplary embodiment of a collective cryptographic transfer regarding non-fungible tokens is illustrated. Computing device 300 may identify a collective resource-backed entity 304. Computing device 300 may be consistent with any computing device as described in the entirety of this disclosure. A "collective resource-backed entity," as used in this disclosure, is an entity comprising a plurality of entities such as resource-backed entities. In a non-limiting embodiment, cryptographic resource-backed entity 304 may be further described in FIG. 4. Collective resource entity 304 may a plurality of resource-backed entities 308, wherein the plurality of resource-backed entities has agreed to pool their cryptographic resources. In some non-limiting embodiments, computing device 300 may generate a profile for collective resource-backed entity 304 such as collective entity profile 312. A "collective entity profile," as used in this disclosure, is any profile associated with a collective resource-backed entity and broadcasted on a decentralized platform. In some non-limiting embodiments, computing device 300 may identify collective resource-backed entity 304 to user 104 as a function of collective entity request condition 128, wherein collective entity request condition 128 indicates that user 104 seeks to find a plurality of collective resource-backed entities to choose a cryptographic exchange partner from. In another non-limiting embodiment, computing device 300 may also identify a plurality of collective resource-backed entities based on user profile 112 and quantitative potential classification 156. For instance, collective resource-backed entity 304 may be exclusive in they users to conduct cryptographic exchange with. Collective resource-backed entity 304 may prefer to select users who are in a preferred quantitative potential classification and/or assigned a preferred predictive quantifier, wherein the preference is denoted by collective resource requirement 316. A "collective resource requirement," as used in this disclosure, is a requirement and/or plurality of requirements that must be met prior to establishing a cryptographic exchange with a cryptographic exchange partner, wherein the collective resource requirement is to be enforced upon the cryptographic exchange partner. In a non-limiting embodiment, collective resource requirement 316 may include any resource condition as described herein and/or contingent to a collective cryptographic resource 320. A "collective cryptographic resource," as used in this disclosure, is a pooled cryptographic resource such as a single cryptographic resource and/or a plurality of individual cryptographic resources. In some non-limiting embodiments, collective cryptographic resource 320 may include any NFT and/or plurality of NFTs. Person of ordinary skill in the art, upon reviewing the entirety of this disclosure, will be aware of the various embodiments and elements of a collective entity as a cryptographic exchange partner for purposes as described herein.

With continued reference to FIG. 3, computing device 300 may generate security token entry 228 as a function of an agreement between user 104 and collective resource-backed entity 304 to conduct a cryptographic exchange. Security token entry 228 may include any security token entry as described herein, wherein the security token entry denotes the initial transaction and/or initiation of the cryptographic exchange. In some non-limiting embodiments, for user 104 to have access to collective cryptographic resource 320, user 104 may temporarily join collective resource-backed entity 304 as another member and/or entity of collective resource-backed entity. In another non-limiting embodiment, cryptographic security 116 may be a collateral, wherein the collateral may be used as an addition to collective cryptographic resource 320. Alternatively or additionally, collective cryptographic resource 320 may include a single cryptographic resource, wherein each resource-backed entity of the plurality of resource-backed entities associated with collective resource-backed entity 304 is a fractional owner of collective cryptographic resource 320. For instance, user 104 may become a temporary fractional owner of collective cryptographic resource 320. Person of ordinary skill in the art, upon reviewing the entirety of this disclosure, will be aware of the various embodiments and elements of a cryptographic exchange in the context of a collective resource-backed entity as a cryptographic exchange partner.

Figure 4:
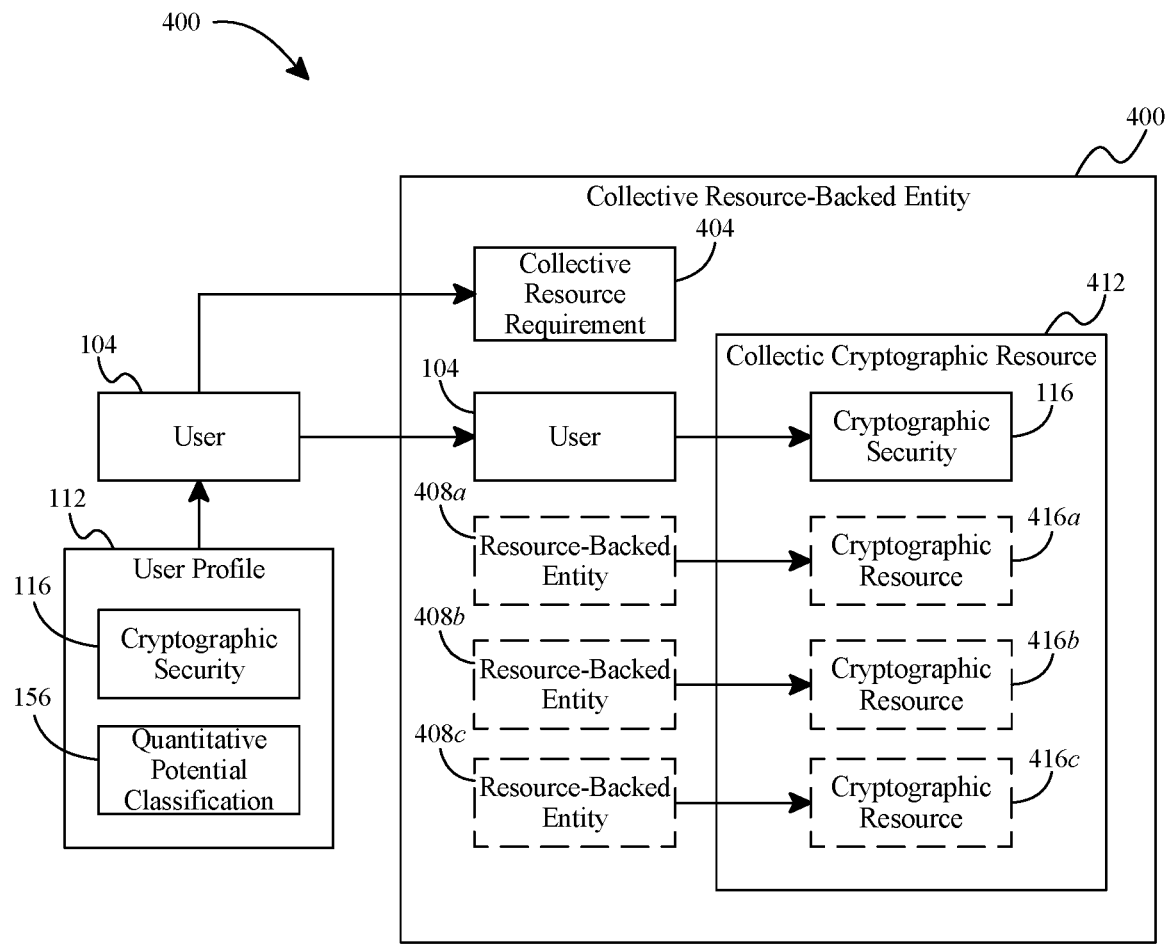
FIG. 4 is a block diagram of an exemplary embodiment of a system for collective resource-backed entity.

Referring now to FIG. 4, a block diagram of an exemplary embodiment of a system for collective resource-backed entity 400 is illustrated. Collective resource-backed entity 400 may be consistent with any collective resource-backed entity as described herein. User 104 may be eligible to join collective resource-backed entity based on collective resource requirement 404 and/or quantitative potential classification 156. User 104 may opt to temporarily join collective resource-backed entity 400 as a temporary member. In a non-limiting embodiment, user 104 may also be eligible to join collective resource-backed entity 400 as a permanent member and thereby become a resource-backed entity, along with the prior members such as resource-backed entity 408*a-c*. As a part of collective resource-backed entity 404, user 104 may be required to submit cryptographic security 116 as a part of collective cryptographic resource 412, wherein each resource-backed entity 408*a-c* has also submitted their own cryptographic resource 416*a-c* to collective cryptographic resource 412. In a non-limiting embodiment, collective resource-backed entity 400 may include a digital wallet connected to the digital wallet of each member of collective resource-backed entity, distributing any capital received as a function of using collective cryptographic resource 412 as an investment vehicle. Alternatively and additionally, each member may be responsible for their own cryptographic resource and/or security. For example and without limitation, in the event collective resource-backed entity 400 has agreed to conduct a cryptographic exchange with a cryptographic exchange partner, only one or more, but not all members of collective resource-backed entity may decide to conduct the cryptographic exchange. For instance, those members, such as any resource-backed entity 408*a-c* including the now new member such as user 104 who have agreed to conduct the cryptographic exchange may offer their cryptographic security and/or resource as a loan, wherein the owner of the respective loaned cryptographic security and/or resource may receive a capital return on their investment. In another non-limiting embodiment, each member may offer their cryptographic security and/or resource into a single collective cryptographic resource, wherein those members are a fractional owner of the single collective cryptographic resource. Person of ordinary skill in the art, upon reviewing the entirety of this disclosure, will be aware of the various embodiments and functions of a collective resource-backed entity for purposes as described herein.

Figure 5:
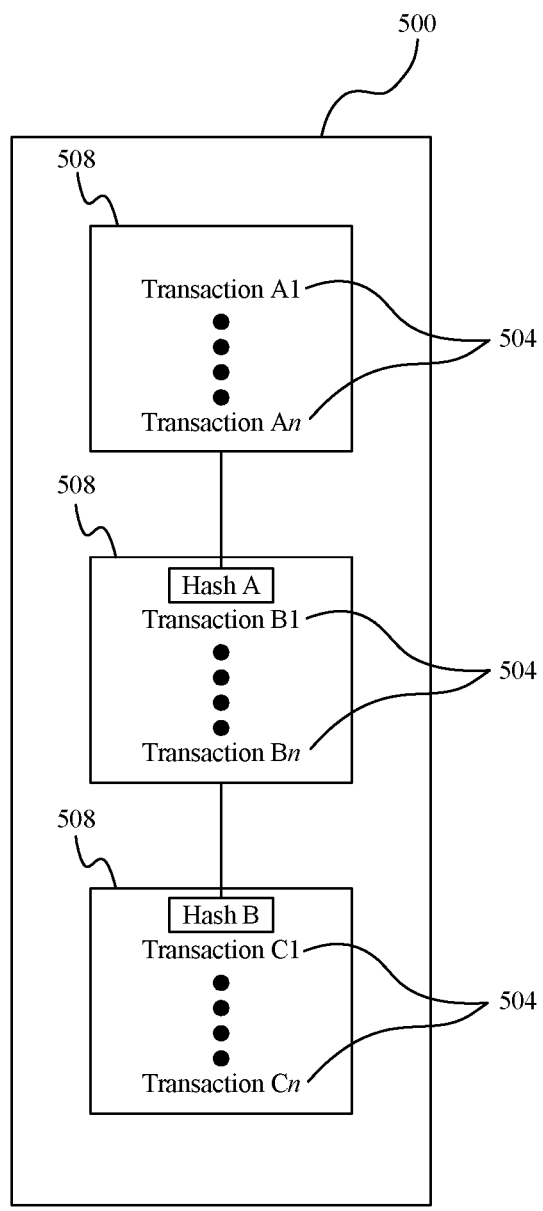
FIG. 5 is a schematic diagram of an exemplary embodiment of an immutable sequential listing.

Now referring to FIG. 5, is a schematic diagram of an exemplary embodiment of an immutable sequential listing 500. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In some non-limiting embodiments, an immutable sequential listing may include a blockchain. A "blockchain," as used in this disclosure is a growing list of records, called blocks, which are linked together using cryptography. Each block contains a cryptographic hash of the previous block, a timestamp, and transaction data (generally represented as a Merkle tree, cryptographic accumulator, or the like thereof). In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $0(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 5, immutable sequential listing 500 may be consistent with immutable sequential listing 220 as described herein. Data elements are listing in immutable sequential listing 500; data elements may include any form of data, including textual data, image data, encrypted data, cryptographically hashed data, and the like. Data elements may include, without limitation, one or more at least a digitally signed assertions. In one embodiment, a digitally signed assertion 504 is a collection of textual data signed using a secure proof as described in further detail above; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 504 register is transferring that item to the owner of an address. A digitally signed assertion 504 may be signed by a digital signature created using the private key associated with the owner's public key, as described above.

Still referring to FIG. 5, a digitally signed assertion 504 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 504 may describe the transfer of a physical good; for instance, a digitally signed assertion 504 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 504 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 504. In some embodiments, address is linked to a public key, the corresponding private key of which is owned by the recipient of a digitally signed assertion 504. For instance, address may be the public key. Address may be a representation, such as a hash, of the public key. Address may be linked to the public key in memory of a processor 104, for instance via a "wallet shortener" protocol. Where address is linked to a public key, a transferee in a digitally signed assertion 504 may record a subsequent a digitally signed assertion 504 transferring some or all of the value transferred in the first a digitally signed assertion 504 to a new address in the same manner. A digitally signed assertion 504 may contain textual information that is not a transfer of some item of value in addition to, or as an alternative to, such a transfer. For instance, as described in further detail below, a digitally signed assertion 504 may indicate a confidence level associated with a distributed storage node as described in further detail below.

In an embodiment, and still referring to FIG. 5 immutable sequential listing 500 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 500 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 500 may preserve the order in which the at least a posted content took place by listing them in chronological order; alternatively or additionally, immutable sequential listing 500 may organize digitally signed assertions 504 into sub-listings 508 such as "blocks" in a blockchain, which may be themselves collected in a temporally sequential order; digitally signed assertions 504 within a sub-listing 508 may or may not be temporally sequential. The ledger may preserve the order in which at least a posted content took place by listing them in sub-listings 508 and placing the sub-listings 508 in chronological order. The immutable sequential listing 500 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 500 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 10161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 5, immutable sequential listing 500, once formed, may be inalterable by any party, no matter what access rights that party possesses. For instance, immutable sequential listing 500 may include a hash chain, in which data is added during a successive hashing process to ensure non-repudiation. Immutable sequential listing 500 may include a block chain. In one embodiment, a block chain is immutable sequential listing 500 that records one or more new at least a posted content in a data item known as a sub-listing 508 or "block." An example of a block chain is the BITCOIN block chain used to record BITCOIN transactions and values. Sub-listings 508 may be created in a way that places the sub-listings 508 in chronological order and link each sub-listing 508 to a previous sub-listing 508 in the chronological order so that any processor 104 may traverse the sub-listings 508 in reverse chronological order to verify any at least a posted content listed in the block chain. Each new sub-listing 508 may be required to contain a cryptographic hash describing the previous sub-listing 508. In some embodiments, the block chain contains a single first sub-listing 508 sometimes known as a "genesis block."

Still referring to FIG. 5, the creation of a new sub-listing 508 may be computationally expensive; for instance, the creation of a new sub-listing 508 may be designed by a "proof of work" protocol accepted by all participants in forming the immutable sequential listing 500 to take a powerful set of computing devices a certain period of time to produce. Where one sub-listing 508 takes less time for a given set of computing devices to produce the sub-listing 508 protocol may adjust the algorithm to produce the next sub-listing 508 so that it will require more steps; where one sub-listing 508 takes more time for a given set of computing devices to produce the sub-listing 508 protocol may adjust the algorithm to produce the next sub-listing 508 so that it will require fewer steps. As an example, protocol may require a new sub-listing 508 to contain a cryptographic hash describing its contents; the cryptographic hash may be required to satisfy a mathematical condition, achieved by having the sub-listing 508 contain a number, called a nonce, whose value is determined after the fact by the discovery of the hash that satisfies the mathematical condition. Continuing the example, the protocol may be able to adjust the mathematical condition so that the discovery of the hash describing a sub-listing 508 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 508 according to the protocol is known as "mining." The creation of a new sub-listing 508 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 508. The incentive may be financial; for instance, successfully mining a new sub-listing 508 may result in the person or entity that mines the sub-listing 508 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 508 Each sub-listing 508 created in immutable sequential listing 500 may contain a record or at least a posted content describing one or more addresses that receive an incentive, such as virtual currency, as the result of successfully mining the sub-listing 508.

With continued reference to FIG. 5, where two entities simultaneously create new sub-listings 508, immutable sequential listing 500 may develop a fork; protocol may determine which of the two alternate branches in the fork is the valid new portion of the immutable sequential listing 500 by evaluating, after a certain amount of time has passed, which branch is longer. "Length" may be measured according to the number of sub-listings 508 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 508 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 500 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 500.

Still referring to FIG. 5, additional data linked to at least a posted content may be incorporated in sub-listings 508 in the immutable sequential listing 500; for instance, data may be incorporated in one or more fields recognized by block chain protocols that permit a person or computer forming a at least a posted content to insert additional data in the immutable sequential listing 500. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical cryptocurrency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third-party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 5, in some embodiments, virtual currency is traded as a cryptocurrency. In one embodiment, a cryptocurrency is a digital, currency such as Bitcoins, Peercoins, Namecoins, and Litecoins. Cryptocurrency may be a clone of another cryptocurrency. The cryptocurrency may be an "alt-coin." Cryptocurrency may be decentralized, with no particular entity controlling it; the integrity of the cryptocurrency may be maintained by adherence by its participants to established protocols for exchange and for production of new currency, which may be enforced by software implementing the cryptocurrency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular cryptocurrency may be limited; the rate at which units of cryptocurrency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 508 in a block chain computationally challenging; the incentive for producing sub-listings 508 may include the grant of new cryptocurrency to the miners. Quantities of cryptocurrency may be exchanged using at least a posted content as described above.

Figure 6:
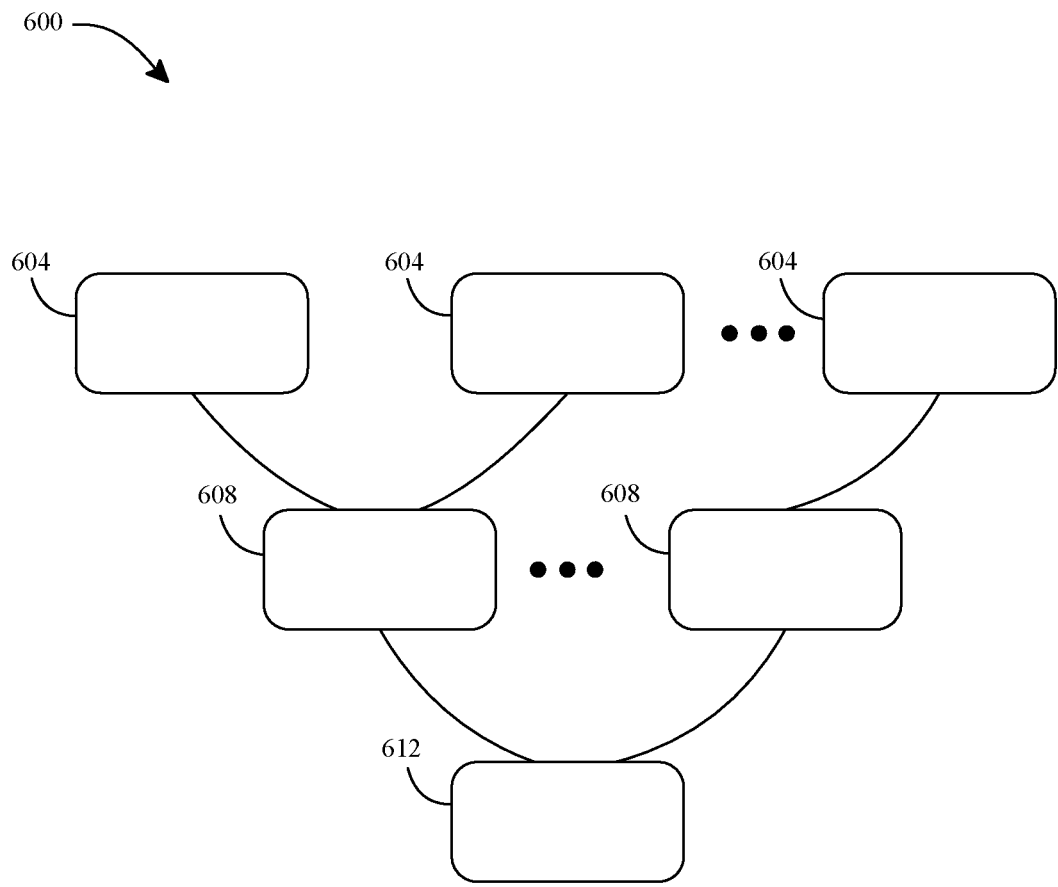
FIG. 6 is a block diagram illustrating an exemplary embodiment of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6, cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
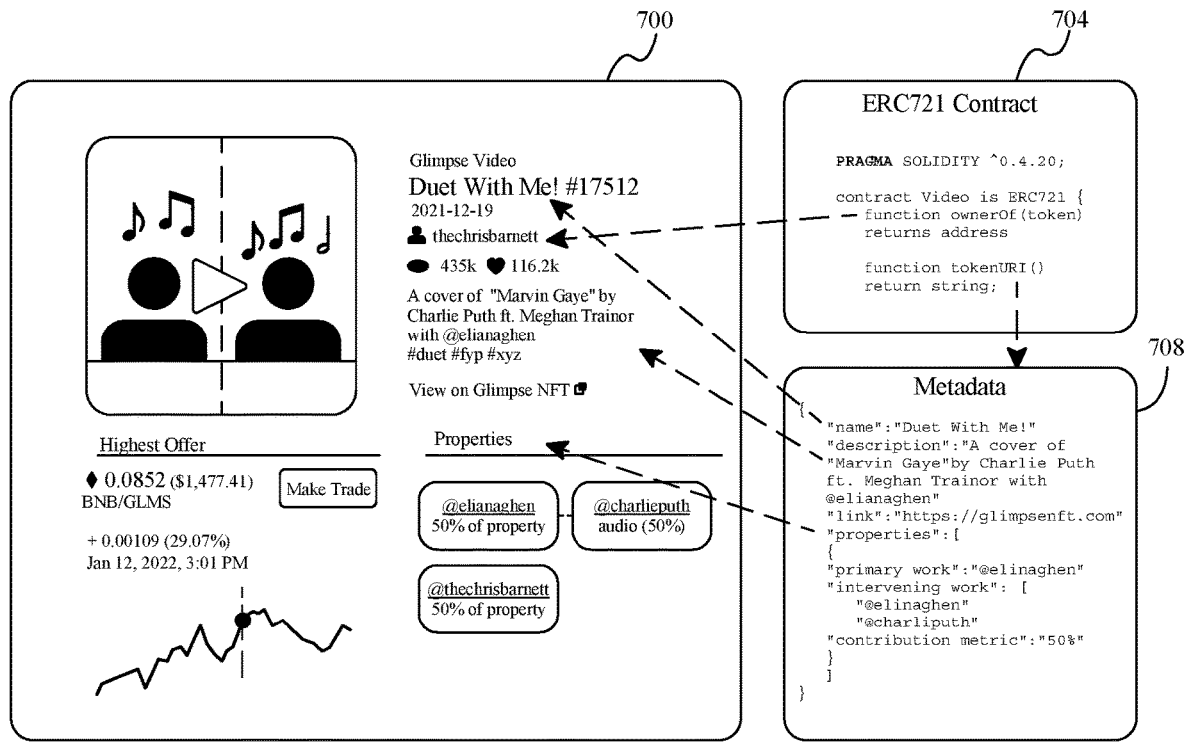
FIG. 7 is an illustration of an exemplary embodiment of a non-fungible token displayed on a decentralized platform.

Now referring to FIG. 7, is an illustration of an exemplary embodiment of a non-fungible token displayed on a decentralized platform is provided. As shown in FIG. 7, an NFT page 700 may include a plurality of information related to an NFT. In some embodiments, NFT page 700 may be incorporated into the NFT itself. NFT page 700 may include quantitative information such as contribution metric, creative value, price, NFT views, NFT likes, creation/mint date, and the like thereof. NFT page 700 may further include information about the creator and/or owner of the NFT, the type of asset NFT embodies, description of the NFT, and at least a link for which the NFT may be publicly accessible. In a non-limiting embodiment, NFT page 700 may be a representation of a decentralized platform and/or decentralized exchange platform for which creators, buyers, sellers, and/or any user may interface with. Persons skilled in the art, upon reviewing the entirety of this disclosure, will be aware of the various embodiments and information displayed in the context of NFTs.

Still referring to FIG. 7, an NFT may be deployed via a digitally signed smart contract which conforms to some standard 704. As shown in FIG. 7, standard 704 displays technical information denoting the type of standard the NFT conforms to. In some embodiments, standard 704 may include information of a smart contract that was digitally signed and contains immutable information such as the identity of the creator. Standard 704 may also include information denoting the metadata of the NFT. The metadata may be modified depending on the standard the NFT conforms too.

With continued reference to FIG. 7, metadata 708 may include a collection of information about the NFT and/or NFT page 700. In some embodiments, metadata 708 may include information identifying the creative influence and/or contribution from other creative works. For example and without limitation, the NFT as seen in NFT page 704 includes a video of a duet. The creator of the NFT (@thechrisbarnett) uses another NFT and its video created by a different creator (@elianaghen) to create the duet. Metadata 708 may include information the embodies the incorporated creative work. Metadata 708, based on the standard to which the NFT conforms to, may be modified to identify the origin and/or creator of the video that @thechrisbarnett uses which may be consistent with an intervening creative work as described above. In some cases, even the intervening creative work may include another intervening creative work. As shown in FIG. 7, the creative work of @elianaghen also incorporates an intervening work in which the intervening work was created by a creator @charlieputh. As shown in FIG. 7, @elianaghen uses the audio from the creative work created by @charlieputh, which is then used by @thechrisbarnett. This chain of information and creative works may be established via metadata 708 and as seen in NFT page 704 which may be configured to provide proper credit to all the creators involved. Persons skilled in the art, upon reviewing the entirety of this disclosure, will be aware of the various embodiments of creative works and NFTs in the context of establishing credit.

Now referring to FIG. 8, a block diagram of an exemplary embodiment of a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, the apparatus of FIG. 1 may incorporate system 800 for a trusted computing architecture. In a non-limiting embodiment, trusted computing may which system 812 and application 808 perform one or more actions, determinations, calculations, or the like as described in this disclosure. Trusted computing may also enable integrated data privacy involving NFTs in the launching of the NFTs on a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data, and other system state information, and remote attestation configured to allow a trusted device to present reliable evidence to remote parties about the software it is running.

In a non-limiting embodiment, and still referring to FIG. 8, trusted computing may include a secure coprocessor and/or cryptoprocessor such as without limitation a Trusted Platform Module (TPM) 820. A "Trusted Platform Module," as used in this disclosure, is a tamper resistant piece of cryptographic hardware built on a system board or other hardware that implements primitive cryptographic functions on which more complex features can be built. A client machine 816 may be integrated with TPM 820 architecture which a server machine 824 may verify. In a non-limiting embodiment, client machine 816 may be consistent with a computing device as described in the entirety of this disclosure. In another non-limiting embodiment, client machine 816 may be consistent with apparatus 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 824 such as a certification authority (CA). A "certificate authority," as used in this disclosure, is an entity that issues digital certificates.

In a non-limiting embodiment and still referring to FIG. 8, a TPM may perform an integrity measurement to enable a user and/or process access to private data. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example and without limitation, at load-time, TPM may use a hash function to fingerprint an executable, an executable plus its input data, or a sequence of such files. These hash values may be used in attestation to reliably establish code identity to remote or local verifiers such as server machine 824. Hash values can also be used in conjunction with a sealed storage feature. A secret may be sealed along with a list of hash values of programs that are allowed to unseal the secret. This may allow creation of data files that can only be opened by specific applications.

With continued reference to FIG. 8, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data is accurate because it is signed by TPM 820 whose key may be certified by a CA. Attestation may include a remote attestation. A "remote attestation," as used in this disclosure, is method by which a host (client) authenticates it's hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 820 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

Figure 9:
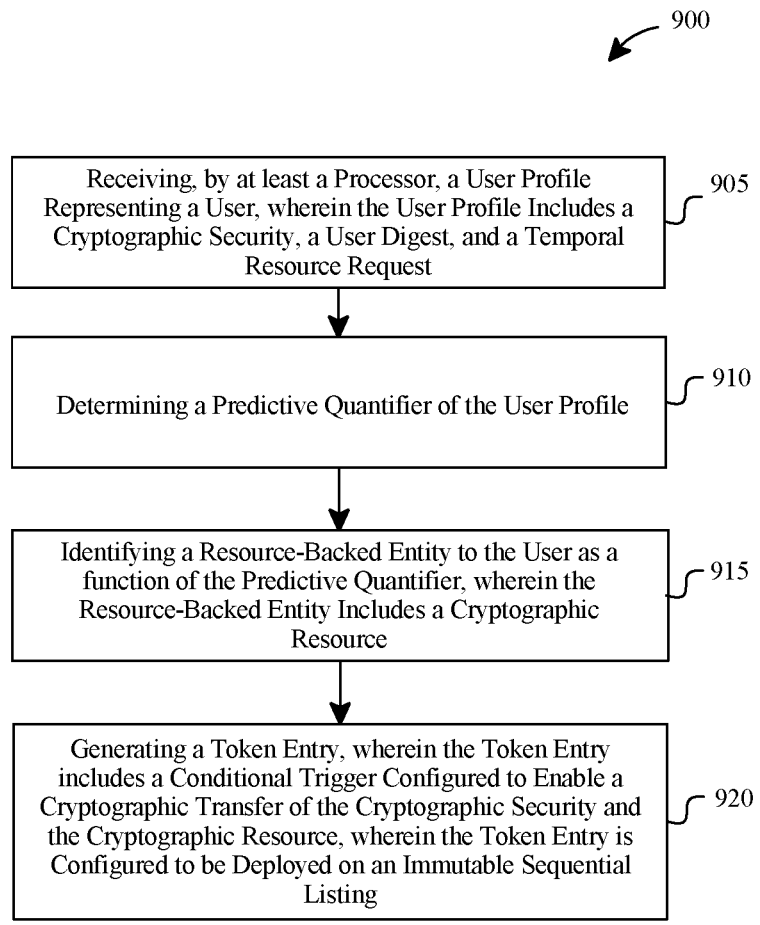
FIG. 9 is a flow diagram of an exemplary embodiment of a method for cryptographic resource transfer based on quantitative assessment regarding non-fungible tokens.

Referring now to FIG. 9, a flow diagram of an exemplary embodiment of a method 900 for cryptographic resource transfer based on quantitative assessment regarding non-fungible tokens is illustrated. At step 905, method 900 includes receiving, by at least a processor communicatively connected to a memory containing instructions for the at least a processor, a user profile representing a user, wherein the user profile comprises a cryptographic security, a user digest, and a temporal resource request. The user profile may include any user profile as described herein. In a non-limiting embodiment, method 800 may include generating the user profile as a function of user data, user chain data, and an external data. For instance, method 800 may include generating the user profile as a function of an oracle device wherein the oracle device is configured to detect and/or generate the external datum. Method 800 may include receiving the user chain data from an immutable sequential listing and/or blockchain to generate the user profile. In another non-limiting embodiment, the user profile may include a collective entity request condition, wherein the at least a processor is configured to identify a plurality of collective resource-backed entities to the user. Person of ordinary skill in the art, upon reviewing the entirety of this disclosure, will be aware of the various processes of receiving and/or generating a user describing online presence in the context of a decentralized cryptographic exchange.

Still referring to FIG. 9, method 900 may include receiving and/or generating a user-backed NFT. The user-backed NFT may include any user-backed NFT as described herein. In a non-limiting embodiment, method 900 may include generating the user profile as a function of a user data, wherein generating the user profile includes generating a user-backed non-fungible token as a function of the cryptographic security and deploying a user-backed token entry comprising the user-backed non-fungible token on the immutable sequential listing as a function of the digitally signed assertion. In another non-limiting embodiment, method 900 may include broadcasting, by the at least a processor, the user profile on a decentralized platform and identify the resource-backed entity as a function of the decentralized platform. The decentralized platform may be consistent with any decentralized platform as described herein. Person of ordinary skill in the art, upon reviewing the entirety of this disclosure, of generating NFTs in the context of decentralized cryptographic exchange.

Still referring to FIG. 9, at step 910, method 900 includes determining a predictive quantifier of the user profile. The predictive quantifier may include any predictive quantifier as described herein. In a non-limiting embodiment, method 900 may include training a quantifier machine-learning model using a quantifier training set and the user profile as an input, wherein the quantifier training set comprises an element of user data correlated to a resource output. The quantifier machine-learning model may include any quantifier machine-learning model as described herein. The quantifier training set may include any quantifier training set as described herein. Method 900 may further include outputting the predictive quantifier as a function of the quantifier training set. In another non-limiting embodiment, method 900 may include generating a quantitative potential classification of the user profile, wherein the quantitative potential classification is calculated based on the predictive quantifier. The quantitative potential classification may include any quantitative classification as described herein. Person of ordinary skill in the art, upon reviewing the entirety of this disclosure, will be aware of using machine-learning for purposes as described herein.

Still referring to FIG. 9, at step 915, method 900 includes identifying a resource-backed entity to the user as a function of the predictive quantifier, wherein the resource-backed entity comprises a cryptographic resource. The resource-backed entity may include any resource-backed entity as described herein. In a non-limiting embodiment, method 900 may include matching the user and resource-backed entity. In another non-limiting embodiment, method 900 may include supervising a cryptographic exchange between the user and the resource-backed entity using the decentralized platform as a medium. In some non-limiting embodiments, method 900 may include identifying a plurality of collective resource-backed entities to the user based on the predictive quantifier of the user profile and a quantifier requirement by each collective resource-backed entity, wherein each collective resource-backed entity comprises a plurality of resource-backed entities, a collective cryptographic resource, and a collective resource requirement. The collective resource-backed entity may include any collective resource-backed entity as described herein. Person of ordinary skill in the art, upon reviewing the entirety of this disclosure, will be aware of the various embodiments of connecting users in the context of decentralized cryptographic exchange.

Still referring to FIG. 9, at step 920, method 900 includes generating a token entry, wherein the token entry comprises a conditional trigger configured to enable a cryptographic transfer of the cryptographic security and the cryptographic resource, wherein the token entry is configured to be deployed on an immutable sequential listing. The token entry may include any token entry as described herein. For example and without limitation, method 900 may include generating a security token entry and a return token entry. The immutable sequential listing may include any immutable sequential listing as described herein. In a non-limiting embodiment, method 900 may include updating the user digest as a function of the cryptographic transfer. In another non-limiting embodiment, method 900 may include recording the token entry datum into a cryptographic entry database. The cryptographic entry database may include any cryptographic entry database as described herein. Person of ordinary skill in the art, upon reviewing the entirety of this disclosure, will be aware of the various embodiments of incorporating blockchain technology in the context of decentralized cryptographic exchange.

Figure 10:
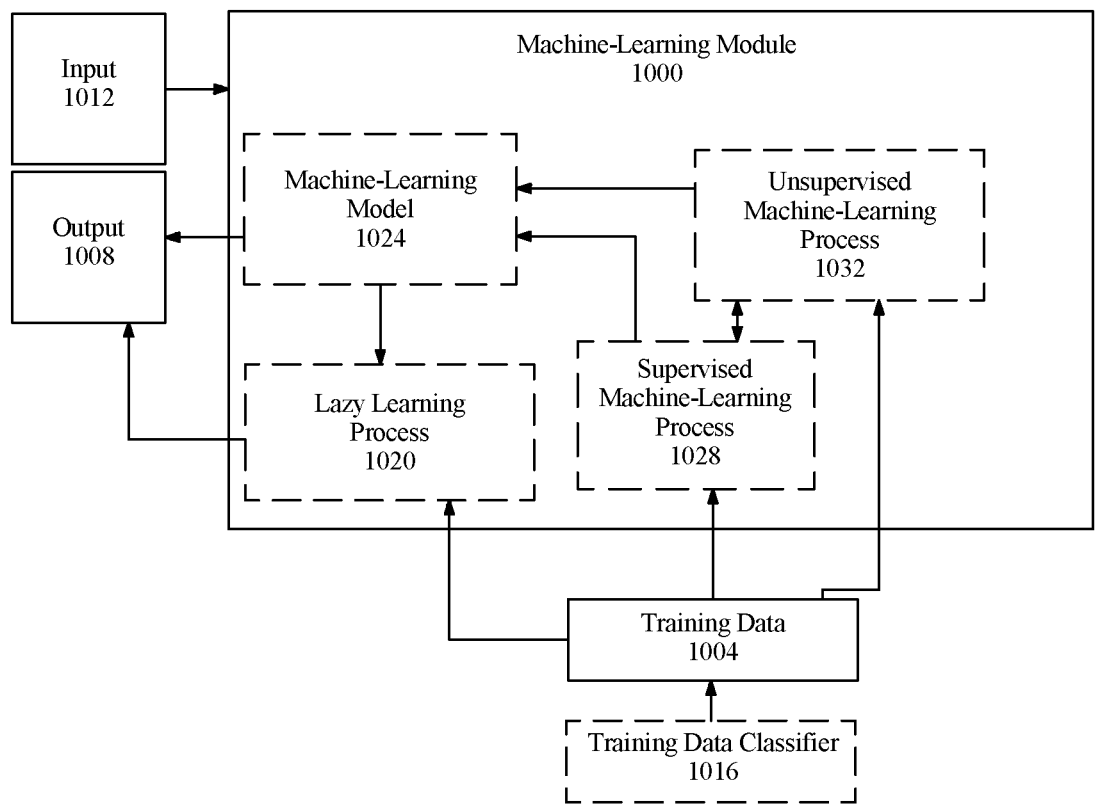
FIG. 10 is a block diagram of an exemplary embodiment of a machine-learning model.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, a user profile may be an input and a predictive quantifier may be an output.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to categories of total cryptographic capital return for which a subset of training data may be selected.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
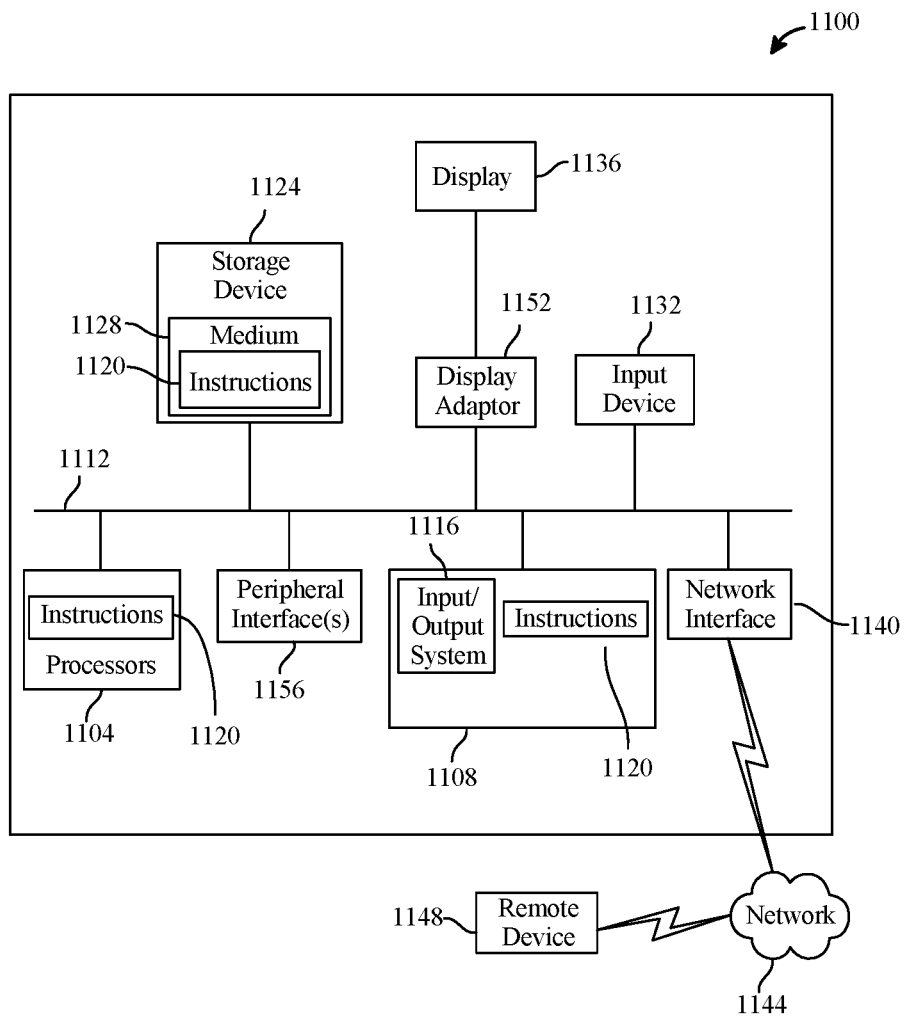
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for cryptographic resource transfer based on quantitative assessment regarding non-fungible tokens, the apparatus comprising:
   at least a processor; and
   a memory communicatively connected to the at least a processor, the memory containing instructions configuring the at least a processor to:
      receive a user profile representing a user, wherein the user profile comprises:
         a cryptographic security;
         a user digest; and
         a temporal resource request;
      determine a predictive quantifier of the user profile using a quantifier machine-learning model, wherein determining the predictive quantifier comprises:
         generating a training data classifier using a machine-learning classification algorithm;
         classifying, using the training data classifier, elements of a quantifier training data into bins, wherein the quantifier training data comprises a plurality of user profile data correlated to a plurality of predictive quantifier data;

selecting, using the training data classifier, a quantifier training data subset as a function of at least the user digest of the user profile representing the user;

training the quantifier machine-learning model using the quantifier training data subset and a machine-learning algorithm;

inputting at least the user digest of the user profile representing the user to the trained quantifier machine-learning model; and outputting the predictive quantifier as a function of at least the user digest using the trained quantifier machine-learning model;

identify a resource-backed entity to the user as a function of the predictive quantifier, wherein the resource-backed entity comprises a cryptographic resource;

generate a state channel between the user and the resource-backed entity, wherein the state channel comprises a smart-contract that enforces predefined rules for off-chain transactions;

generate a token entry, wherein the token entry comprises a first conditional trigger, wherein the first conditional trigger comprises an indication of a final transaction of the state channel;

deploy the token entry on an immutable sequential listing;

enable, using the first conditional trigger, a cryptographic transfer of the cryptographic security and the cryptographic resource, wherein enabling the cryptographic transfer comprises:

temporarily storing, in a conditional wallet, the cryptographic security and cryptographic capital as a function of a locked payment trigger and a resource condition associated with the cryptographic resource;

update the user profile representing the user as a function of user chain data, wherein the user chain data comprises information on the cryptographic transfer recorded on the immutable sequential listing; and generate a return token entry comprising a return token entry data, wherein the return token entry data comprises a second conditional trigger, wherein the second conditional trigger comprises a final cryptographic transfer.

2. The apparatus of claim 1, wherein the at least a processor is further configured to generate the user profile as a function of a user data, wherein generating the user profile comprises:

generating a security token entry as a function of the cryptographic security; and deploying the security token entry comprising a user-backed non-fungible token on the immutable sequential listing as a function of a digitally signed assertion.

3. The apparatus of claim 1, wherein the at least a processor further is further configured to:

broadcast the user profile on a decentralized platform; and identify the resource-backed entity as a function of the decentralized platform.

4. The apparatus of claim 1, wherein the at least a processor is further configured to:

receive an external data from an oracle device; and verify the user profile as a function of the external data.

5. The apparatus of claim 1, wherein the at least a processor is further configured to update the user digest as a function of the cryptographic transfer.

6. The apparatus of claim 1, wherein the at least a processor is further configured to generate a quantitative potential classification of the user profile, wherein the quantitative potential classification is calculated based on the predictive quantifier.

7. The apparatus of claim 1, wherein the at least a processor is further configured to record the token entry datum into a cryptographic entry database.

8. The apparatus of claim 1, wherein the at least a processor is further configured to identify a plurality of collective resource-backed entities to the user based on the predictive quantifier of the user profile and a quantifier requirement by each collective resource-backed entity, wherein each collective resource-backed entity comprises:

a plurality of resource-backed entities;

a collective cryptographic resource; and a collective resource requirement.

9. The apparatus of claim 1, wherein the user profile further comprises a collective entity request condition indicating the at least a processor to identify a plurality of collective resource-backed entities to the user.

10. A method for cryptographic resource transfer based on quantitative assessment regarding non-fungible tokens, the method comprising:

receiving, by at least a processor communicatively connected to a memory containing instructions for the at least a processor, a user profile representing a user, wherein the user profile comprises:

a cryptographic security;

a user digest; and a temporal resource request;

determining a predictive quantifier of the user profile using a quantifier machine-learning model, wherein determining the predictive quantifier comprises:

generating, by the at least a processor, a training data classifier using a machine-learning classification algorithm;

classifying, by the at least a processor, using the training data classifier, elements of a quantifier training data into bins, wherein the quantifier training data comprises a plurality of user profile data correlated to a plurality of predictive quantifier data;

selecting, by the at least a processor, using the training data classifier, a quantifier training data subset as a function of at least the user digest of the user profile representing the user;

training, by the at least a processor, the quantifier machine-learning model using the quantifier training data subset and a machine-learning algorithm;

inputting, by the at least a processor, at least the user digest of the user profile representing the user to the trained quantifier machine-learning model; and outputting, by the at least a processor, the predictive quantifier as a function of at least the user digest using the trained quantifier machine-learning model;

identifying a resource-backed entity to the user as a function of the predictive quantifier, wherein the resource-backed entity comprises a cryptographic resource;

generating a state channel between the user and the resource-backed entity, wherein the state channel comprises a smart-contract that enforces predefined rules for off-chain transactions;

generating a token entry, wherein the token entry comprises a first conditional trigger, wherein the first conditional trigger comprises an indication of a final transaction of the state channel;

deploying the token entry on an immutable sequential listing;

enabling, using the first conditional trigger, a cryptographic transfer of the cryptographic security and the cryptographic resource, wherein enabling the cryptographic transfer comprises:

temporarily storing, in a conditional wallet, the cryptographic security and cryptographic capital as a function of a locked payment trigger and a resource condition associated with the cryptographic resource; and updating the user profile representing the user as a function of user chain data, wherein the user chain data comprises information on the cryptographic transfer recorded on the immutable sequential listing; and generating a return token entry comprising a return token entry data, wherein the return token entry data comprises a second conditional trigger, wherein the second conditional trigger comprises a final cryptographic transfer.

11. The method of claim 10, wherein the method further comprises generating the user profile as a function of a user data, wherein generating the user profile comprises:

generating a user-backed non-fungible token as a function of the cryptographic security; and deploying a user-backed token entry comprising a user-backed non-fungible token on the immutable sequential listing as a function of the digitally signed assertion.

12. The method of claim 10, wherein method further comprises:

broadcasting, by the at least a processor, the user profile on a decentralized platform; and identify the resource-backed entity as a function of the decentralized platform.

13. The method of claim 10, wherein the method further comprises:

receiving, by the at least a processor, an external data from an oracle device; and verifying the user profile as a function of the external data.

14. The method of claim 10, wherein the method further comprises updating the user digest as a function of the cryptographic transfer.

15. The method of claim 10, wherein the method further comprises generating a quantitative potential classification of the user profile, wherein the quantitative potential classification is calculated based on the predictive quantifier.

16. The method of claim 10, wherein the method further comprises recording the token entry datum into a cryptographic entry database.

17. The method of claim 10, wherein the method further comprises identifying a plurality of collective resource-backed entities to the user based on the predictive quantifier of the user profile and a quantifier requirement by each collective resource-backed entity, wherein each collective resource-backed entity comprises:

a plurality of resource-backed entities;

a collective cryptographic resource; and a collective resource requirement.

18. The method of claim 10, wherein the user profile further comprises a collective entity request condition indicating the at least a processor to identify a plurality of collective resource-backed entities to the user.

* * * * *